(12) United States Patent
Paik et al.

(10) Patent No.: US 12,515,239 B2
(45) Date of Patent: Jan. 6, 2026

(54) METHOD FOR MANUFACTURING THERMOCHROMIC FILM, THERMOCHROMIC FILM MANUFACTURED USING THE SAME, AND SMART WINDOW INCLUDING THE THERMOCHROMIC FILM

(71) Applicant: Chungang University Industry Academic Cooperation Foundation, Seoul (KR)

(72) Inventors: Taejong Paik, Seoul (KR); Yoonjoo Choi, Seoul (KR)

(73) Assignee: CHUNGANG UNIVERSITY INDUSTRY ACADEMIC COOPERATION FOUNDATION, Seoul (KR)

( * ) Notice: Subject to any disclaimer, the term of this patent is extended or adjusted under 35 U.S.C. 154(b) by 355 days.

(21) Appl. No.: 18/304,794

(22) Filed: Apr. 21, 2023

(65) Prior Publication Data
US 2024/0042485 A1 Feb. 8, 2024

(30) Foreign Application Priority Data
Aug. 3, 2022 (KR) .................. 10-2022-0096712

(51) Int. Cl.
*B05D 5/06* (2006.01)
*G02F 1/01* (2006.01)
(52) U.S. Cl.
CPC ........... *B05D 5/066* (2013.01); *G02F 1/0147* (2013.01)

(58) Field of Classification Search
CPC .................. B05D 5/066; G02F 1/0147
See application file for complete search history.

(56) References Cited

U.S. PATENT DOCUMENTS

| 2014/0333984 | A1* | 11/2014 | Choi | .............. C03C 17/3657 |
| | | | | 977/774 |
| 2017/0158554 | A1* | 6/2017 | Ko | .............. C23C 14/3464 |
| 2017/0307910 | A1 | 10/2017 | Nishio | |

FOREIGN PATENT DOCUMENTS

KR 20160133046 11/2016

OTHER PUBLICATIONS

Office Action issued in corresponding Korean Application No. 10-2022-0096712, dated Jul. 5, 2024 (English Translation provided).

* cited by examiner

*Primary Examiner* — Joseph L Williams
(74) *Attorney, Agent, or Firm* — NORTON ROSE FULBRIGHT US LLP

(57) ABSTRACT

Disclosed are a method for manufacturing a thermochromic film, a thermochromic film manufactured using the same, and a smart window including the thermochromic film. The method for manufacturing the thermochromic film includes a first step of forming a metal thin-film on a substrate; and a second step including: heating a first solution containing a vanadium dioxide precursor to perform hydrothermal synthesis of vanadium dioxide; dispersing the synthesized vanadium dioxide in a solvent to prepare ink; and applying the ink onto a surface of the metal thin-film formed on the substrate to coat vanadium dioxide on the metal thin-film.

18 Claims, 44 Drawing Sheets

METHOD FOR MANUFACTURING THERMOCHROMIC FILM, THERMOCHROMIC FILM MANUFACTURED USING THE SAME, AND SMART WINDOW INCLUDING THE THERMOCHROMIC FILM

CROSS-REFERENCE TO RELATED APPLICATION

This application claims a benefit under 35 U.S.C. § 119A of Korean Patent Application No. 10-2022-0096712 filed on Aug. 3, 2022, on the Korean Intellectual Property Office, the entirety of disclosure of which is incorporated herein by reference for all purposes.

BACKGROUND

Field

The present disclosure relates to a method for manufacturing a thermochromic film, a thermochromic film manufactured using the same, and a smart window including the thermochromic film.

Description of Related Art

Global energy shortage has occurred. Thus, there is an ongoing movement to prevent inefficient energy loss. In this regard, smart window technology is presented as one of the future technologies that improve energy efficiency. The smart window can adjust transmittance of sunlight to reduce energy loss inside the building and reduce an amount of electrical energy used for heating and cooling.

There are two types of smart windows: a passive type smart window in which a specific material is deposited on a glass to shield or transmit sunlight, and an active type smart window that artificially adjusts the transmittance using external stimuli. The smart window technologies include electrochromic, thermochromic, polymer dispersed liquid crystal (DPLC), and suspended particle device (SPD) windows. The thermochromic smart window uses a phase change material whose a transmittance changes depending on a temperature to block or to transmit infrared rays. Vanadium dioxide as one of the most popular materials of the thermochromic smart window plays a role in controlling transmission of infrared rays depending on an outside temperature. Therefore, the thermochromic phenomenon may occur in a room temperature range similar to the outside temperature.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

One purpose of the present disclosure is to provide a method for manufacturing a room temperature color-change thermochromic film that may be applied to a smart window in a simple process.

Another purpose of the present disclosure is to provide a thermochromic film for a window and a door having a curved surface such as an outer wall of a building using a flexible substrate, wherein the thermochromic film is manufactured using the above manufacturing method.

Still another purpose of the present disclosure is to provide a smart window to which the thermochromic film is applied.

Purposes according to the present disclosure are not limited to the above-mentioned purpose. Other purposes and advantages according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims or combinations thereof.

A first aspect of the present disclosure provides a method for manufacturing a thermochromic film for a smart window, the method comprising: a first step of forming a metal thin-film on a substrate; and a second step including: heating a first solution containing a vanadium dioxide precursor to perform hydrothermal synthesis of vanadium dioxide ($VO_2$); dispersing the synthesized vanadium dioxide in a solvent to prepare ink; and applying the ink onto a surface of the metal thin-film formed on the substrate to coat vanadium dioxide on the metal thin-film.

In one embodiment of the first aspect, the first solution further contains tungsten at 0.75 mol % or smaller.

In one embodiment of the first aspect, the substrate includes polyethylene terephthalate (PET).

In one embodiment of the first aspect, the metal thin-film includes at least one metal selected from a group consisting of silver, aluminum, platinum, palladium and gold.

In one embodiment of the first aspect, the metal thin-film includes a silver thin-film, wherein the silver thin-film has a thickness in a range of of 3 to 20 nm.

A second aspect of the present disclosure provides a thermochromic film for a smart window, wherein the thermochromic film is manufactured by the method as described above.

A third aspect of the present disclosure provides a thermochromic film for a smart window, the thermochromic film comprising: a substrate; a metal thin-film layer formed on the substrate; and a vanadium dioxide thin-film formed on the metal thin-film layer, wherein the substrate includes polyethylene terephthalate (PET).

In one embodiment of the third aspect, the metal thin-film layer includes at least one metal selected from a group consisting of silver, aluminum, platinum, palladium and gold.

In one embodiment of the third aspect, the vanadium dioxide thin-film further contains tungsten at 0.75 mol % or smaller.

In one embodiment of the third aspect, the metal thin-film layer includes a silver thin-film, wherein the silver thin-film has a thickness in a range of 3 to 20 nm.

In one embodiment of the third aspect, the thermochromic film exhibits color-variation at a temperature of 30 to 75° C.

A fourth aspect of the present disclosure provides a smart window comprising: a window substrate; and a thermochromic film attached to at least one face of the window substrate, wherein the thermochromic film includes the thermochromic film as described above.

The method for manufacturing the thermochromic film for a smart window according to the embodiment of the present disclosure is capable of synthesizing the monoclinic vanadium dioxide nanoparticles without a heat treatment process, unlike the conventional method. Thus, a transparent film including a flexible film made of a polymer material such as PET may be used as the substrate. A color-variation range and a color-variation causing temperature range may be determined by adjusting a type and a content of a material.

The color-variation range and the color-variation causing temperature range of the thermochromic film for a smart window according to an embodiment of the present disclosure may be determined so as to have a practical transmittance at room temperature.

The smart window according to an embodiment of the present disclosure in which the thermochromic film is attached to at least one face of the window substrate may replace a general window.

BRIEF DESCRIPTION OF DRAWINGS

Figure 5A:
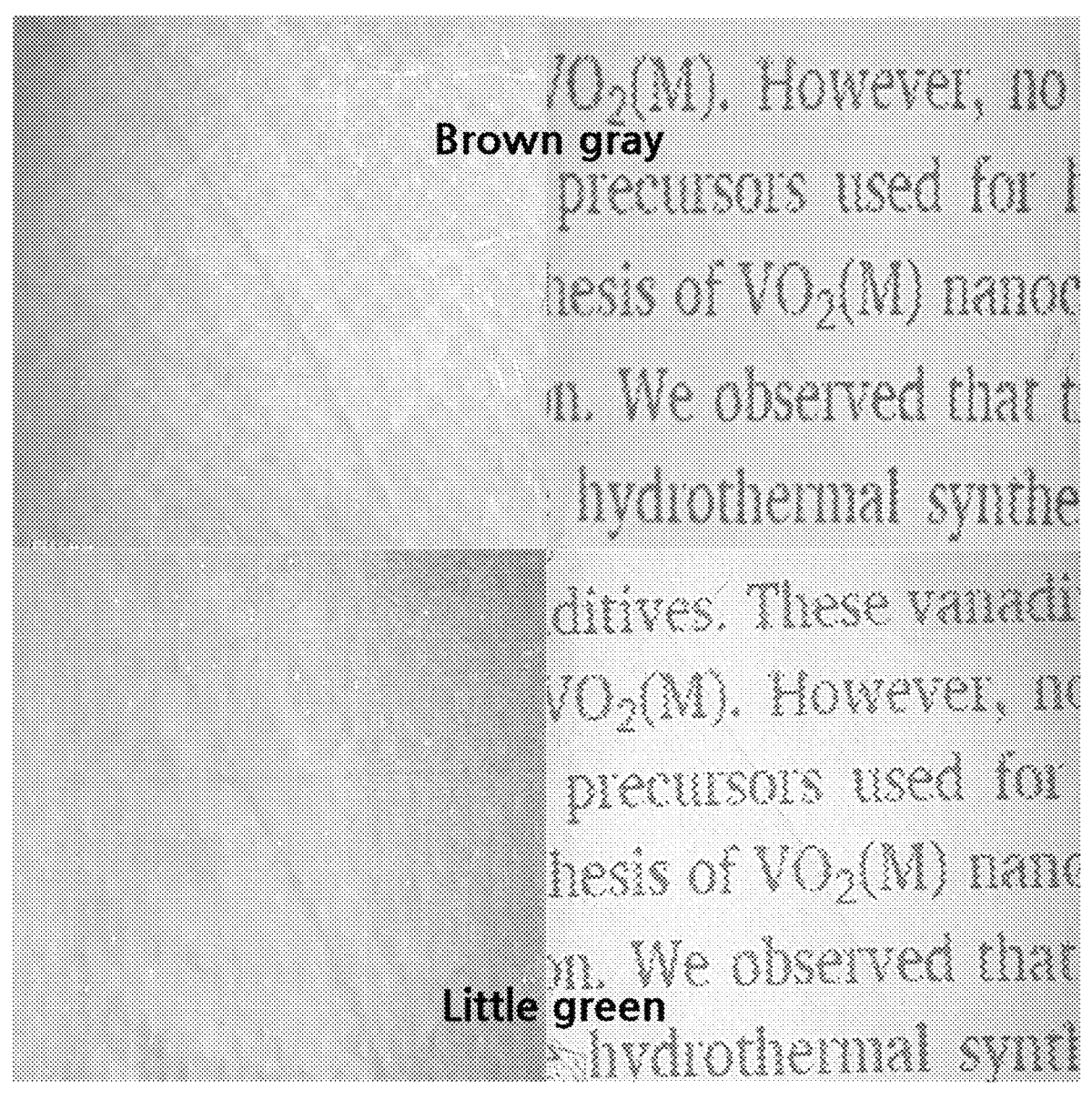
Figure 5C:
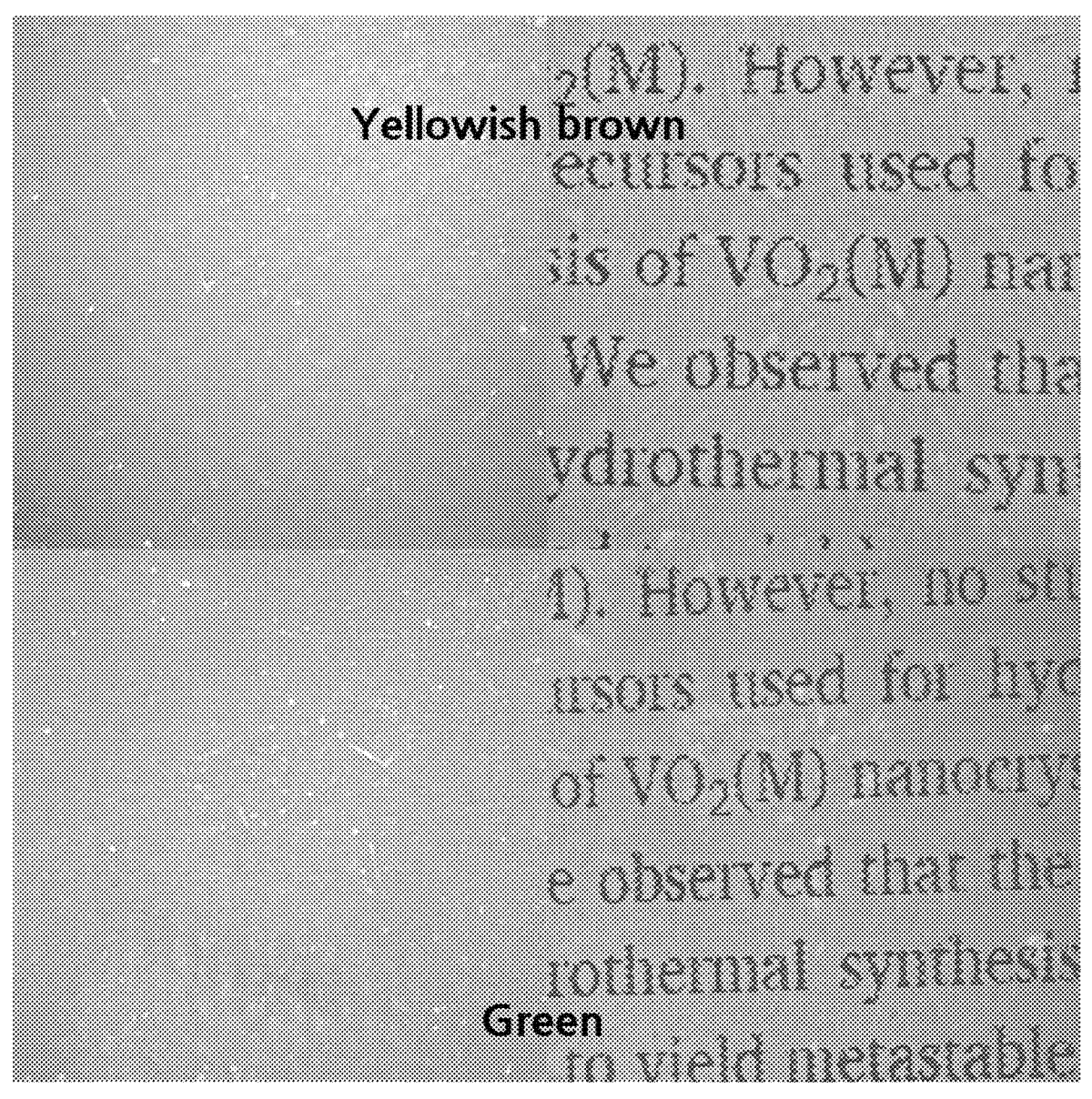

FIG. 5A to FIG. 5D are color-variation photographs at high and low temperatures of a thermochromic film for a smart window according to the present disclosure when a silver deposition thickness is 0.34, 1.67, 3.37 and 10 nm, respectively.

Figure 12A:
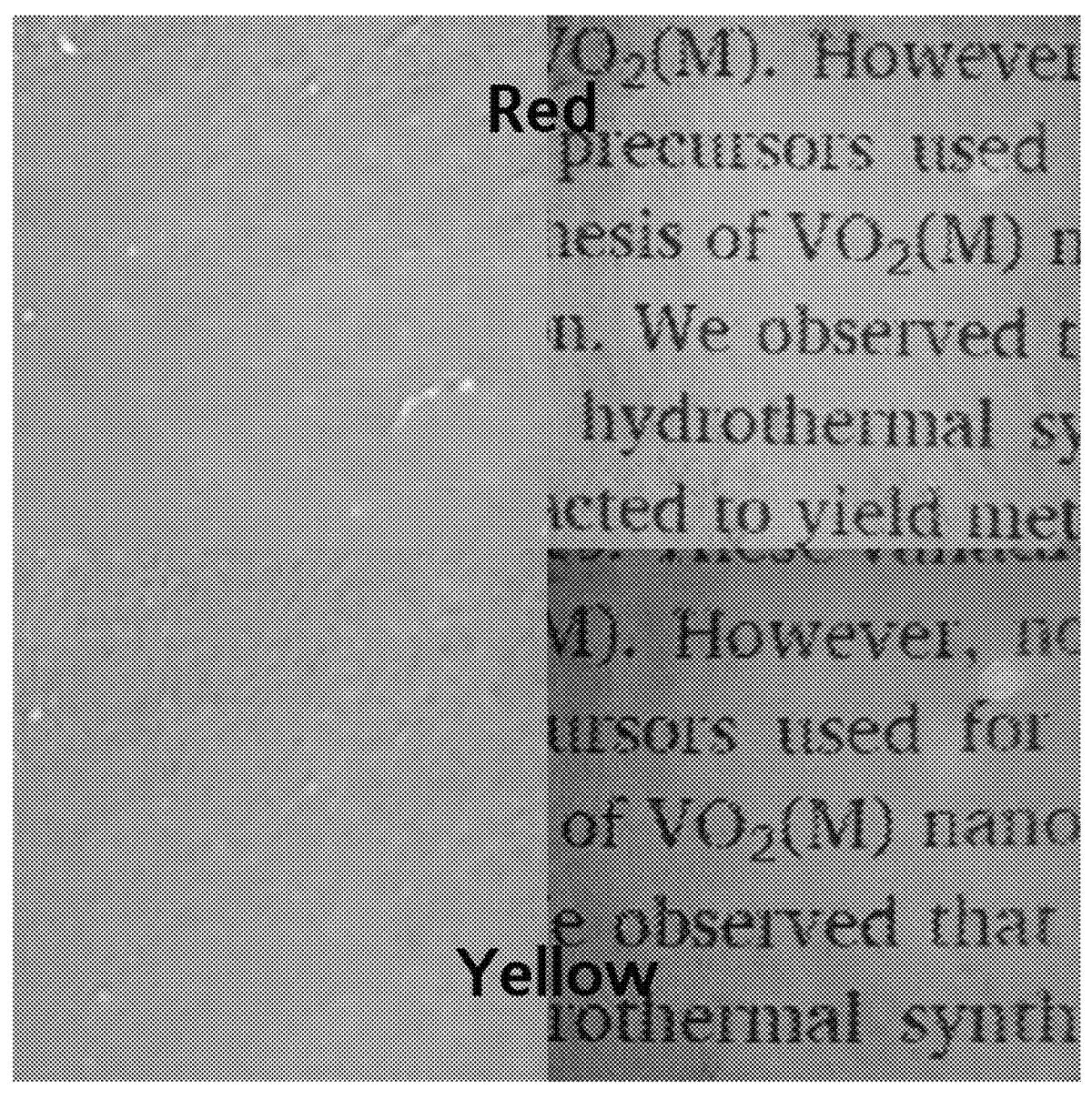
Figure 12E:
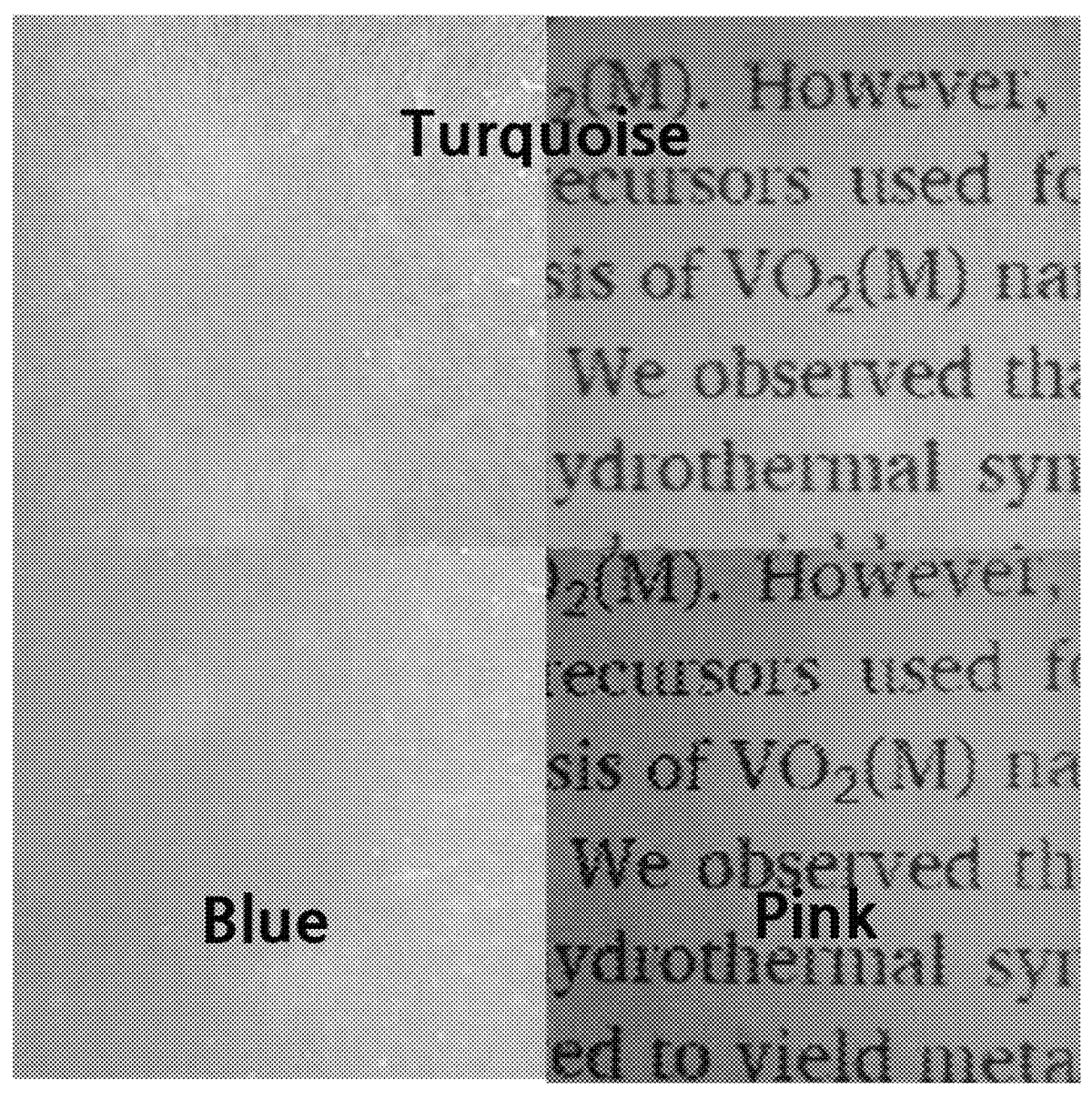

FIG. 12A to FIG. 12E are photographs and graphs when a thickness of a vanadium dioxide thin-film is 800, 820, 850, 900, and 950 nm, respectively.

DETAILED DESCRIPTIONS

Figure 1:
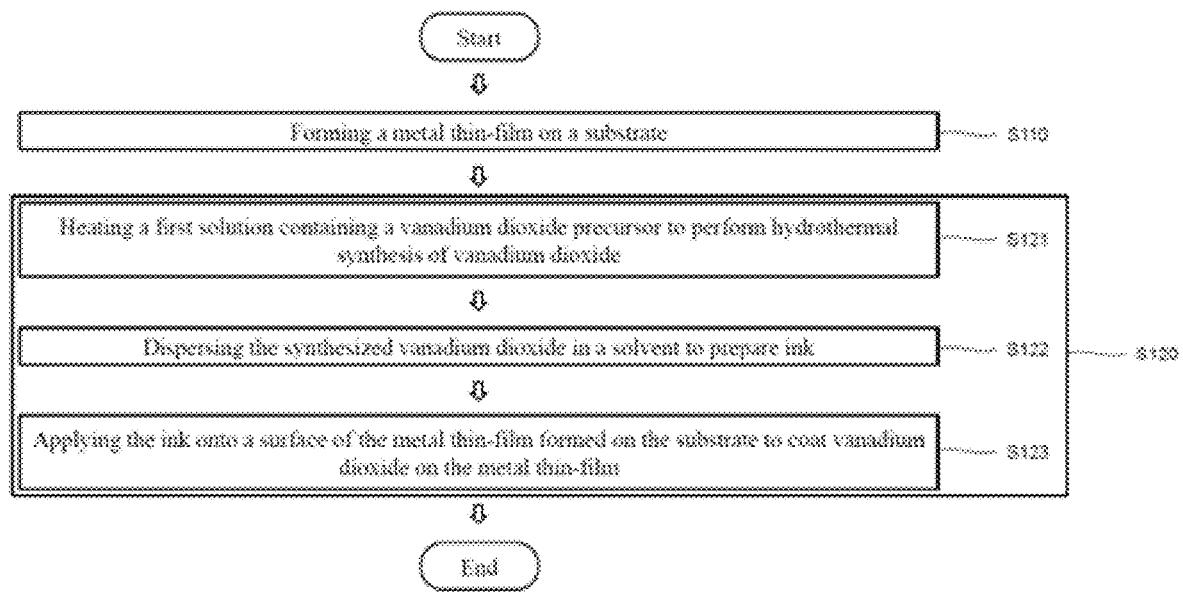
FIG. 1 is a flowchart showing a method for manufacturing a thermochromic film for a smart window according to an embodiment of the present disclosure.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may be included in the spirit and scope of the present disclosure as defined by the appended claims.

A shape, a size, a ratio, an angle, a number, etc. disclosed in the drawings for illustrating embodiments of the present disclosure are illustrative, and the present disclosure may not be limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprise", "comprising", "include", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items.

Expression such as "at least one of" when preceding a list of elements may modify the entirety of list of elements and may not modify the individual elements of the list. When referring to "C to D", this means C inclusive to D inclusive unless otherwise specified.

It will be understood that, although the terms "first", "second", "third", and so on may be used herein for illustrating various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers. It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like may be disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like may be disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In one example, when a certain embodiment may be implemented differently, a function or operation specified in a specific block may occur in a sequence different from that specified in a flowchart. For example, two consecutive blocks may be actually executed at the same time. Depending on a related function or operation, the blocks may be executed in a reverse sequence.

In descriptions of temporal relationships, for example, temporal precedent relationships between two events such as "after", "subsequent to", "before", etc., another event may occur therebetween unless "directly after", "directly subsequent" or "directly before" is not indicated.

The features of the various embodiments of the present disclosure may be partially or entirely combined with each other, and may be technically associated with each other or operate with each other. The embodiments may be implemented independently of each other and may be implemented together in an association relationship.

Spatially relative terms, such as "beneath," "below," "lower," "under," "above," "upper," and the like, may be used herein for ease of explanation for illustrating one element or feature's relationship to another element or feature as illustrated in the figures. It will be understood that the spatially relative terms are intended to encompass different orientations of the device in use or in operation, in addition to the orientation depicted in the figures. For example, when the device in the drawings may be turned over, elements described as "below" or "beneath" or "under" other elements or features would then be oriented "above" the other elements or features. Thus, the example terms "below" and "under" may encompass both an orientation of above and below. The device may be otherwise oriented, for example, rotated 90 degrees or at other orientations, and the spatially relative descriptors used herein should be interpreted accordingly.

FIG. 1 is a flowchart showing a method for manufacturing a thermochromic film for a smart window according to an embodiment of the present disclosure.

Referring to FIG. 1, the method for manufacturing the thermochromic film for a smart window according to an embodiment of the present disclosure may include a first step S110 of forming a metal thin-film on a substrate; and a second step S120, wherein the second step S120 includes a step S121 of heating a first solution containing a vanadium dioxide precursor to perform hydrothermal synthesis of vanadium dioxide; a step S122 of dispersing the synthesized vanadium dioxide in a solvent to prepare ink; and a step of S123 of applying the ink to a surface of the metal thin-film formed on the substrate to coat the vanadium dioxide thereon.

The first step S110 is a step of forming a metal thin-film that may function as a reflector on the substrate. Forming the metal thin-film may coating the metal thin-film on the substrate. As long as the coating is performed to achieve the above function, a coating scheme is not particularly limited. Non-limiting examples of the coating scheme may include sputtering. In one example, since the metal thin-film functions as the reflector on the substrate, it may be necessary to adjust a thickness of the metal thin-film so as to have visible light reflection and target reflectance and transmittance. As long as the above function is achieved, a type and a shape of the metal thin-film are not particularly limited. In one embodiment, the metal thin-film may include a silver thin-film. In order to achieve the target reflectance, the thickness of the metal thin-film functioning as the reflector formed on the substrate should be controlled. In one embodiment, the metal thin-film may include a silver thin-film, and the silver thin-film may be coated on the substrate so as to have a thickness of about 3 to 20 nm. In one embodiment, the metal thin-film may include a silver thin-film, and the silver thin-film may be coated on the substrate so as to have a thickness of about 0.34 to 20 nm, about 1.67 to 20 nm, about 3.34 to 20 nm, or about 10 to 20 nm.

The second step S120 is a step of coating the vanadium dioxide on the metal thin-film formed on the substrate. In the vanadium dioxide, a metal-insulator transition occurs before and after a phase transition temperature, and thus optical properties thereof change, thereby realizing thermochromic properties. As long as the above function is achieved, a scheme of coating the vanadium dioxide is not particularly limited. Non-limiting examples thereof may include spin coating, spray coating, roll coating, or the like.

In one embodiment of the present disclosure, the second step may be performed by sequentially implementing two or more sub-steps. The hydrothermal synthesis of the vanadium dioxide in S121 is a step of synthesizing monoclinic vanadium dioxide nanoparticles as a thermochromic material. When the solution is referred to as a first solution, the first solution contains a vanadium dioxide precursor. First solution phase vanadium dioxide may be synthesized from the vanadium dioxide precursor via a hydrothermal synthesis process. In one embodiment, the first solution phase vanadium dioxide may be synthesized in a powder form. As long as the above hydrothermal synthesis process can proceed, a solvent of the first solution is not particularly limited, and non-limiting examples thereof may include deionized water (DI water). Further, as long as the vanadium dioxide can be synthesized in the above hydrothermal synthesis process, a type of the vanadium dioxide precursor is not particularly limited, and non-limiting examples thereof may include ammonium metavanadate ($NH_4VO_3$). As long as the vanadium dioxide is synthesized via the above hydrothermal synthesis process, a temperature at which the hydrothermal synthesis process proceeds is not particularly limited. In one embodiment, the temperature at which the hydrothermal synthesis process proceeds may be in a range of about 260 to 300° C. As long as the vanadium dioxide is synthesized via the above hydrothermal synthesis process, a time duration for which the hydrothermal synthesis process proceeds is not particularly limited. In one embodiment, the time duration may be in a range of about 16 to 20 hours.

In one example, the scope of the present disclosure does not exclude inclusion of a material other than vanadium dioxide in the material to be coated, as long as the inclusion achieves the function as described above. In one example, tungsten may be contained in the first solution, and tungsten doping may be contained in the vanadium dioxide coating. In one example, the first solution may contain the vanadium dioxide nanoparticles doped with tungsten. A general phase transition temperature of the vanadium dioxide is about 68° C. The phase transition temperature thereof may be lowered when the tungsten doping is contained therein. Therefore, a tungsten content may be determined to achieve an intended phase transition temperature range. In one embodiment, the first solution may further contain about 0.75 mol % or smaller of tungsten.

The vanadium dioxide is synthesized via the hydrothermal synthesis process in S121. Unlike a scheme of coating the substrate with a vanadium dioxide precursor and then heat-treating the coating, the ink containing the vanadium dioxide nanoparticles is prepared and is applied. In this case, it is not necessary to heat-treat the substrate. Thus, a wider range of a transparent substrate including a flexible film may be used. For example, a polymer substrate may be denatured or destroyed at high temperatures at which the vanadium dioxide is synthesized from a vanadium dioxide precursor. However, according to the present disclosure, the vanadium dioxide may be synthesized via the hydrothermal synthesis and then may be applied on the substrate to manufacture the thermochromic film. Thus, the polymer substrate may be used as the substrate. Thus, a type of the substrate is not particularly limited. In one embodiment, the substrate may include polyethylene terephthalate (PET).

In one embodiment, the metal thin-film may include a thin-film made of one or more metals selected from a group including silver, aluminum, platinum, palladium, and gold.

The step of preparing the ink in S122 is a step of dispersing the synthesized vanadium dioxide in a solvent to prepare the ink in a state in which the ink may be applied on the substrate. In one embodiment, a polymeric dispersant may be used to prepare the vanadium dioxide ink. In one embodiment, sonication may be used for the dispersion. When the vanadium dioxide is applied on the substrate to form a thin-film, a method known in the art for improving dispersibility of the ink may be applied to improve uniformity of the thin-film. As long as the ink preparation process as described above can be performed, a solvent of the ink solution is not particularly limited, and non-limiting examples thereof may include isopropyl alcohol (IPA). Further, the dispersant in the above ink preparation process is not particularly limited, and non-limiting examples thereof may include polyvinylpyrrolidone.

The vanadium dioxide coating step S123 is a step of forming a thin-film by applying and coating the ink prepared in the ink preparation step S122 on the metal thin-film. The coating scheme is not particularly limited, and non-limiting examples thereof may include a spin-coating scheme. Further, the step of coating the vanadium dioxide on the metal thin-film in S123 is a step of coating the vanadium dioxide synthesized in the hydrothermal synthesis step S121 on the metal thin-film formed on the substrate. As described above, the vanadium dioxide serves to impart thermochromic properties in the film. Thus, the coating scheme is not particularly limited as long as it performs the above function. Non-limiting examples of the coating scheme may include spin coating.

As described above, the method for manufacturing the thermochromic film for a smart window according to the embodiment of the present disclosure is capable of synthesizing the monoclinic vanadium dioxide nanoparticles without a heat treatment process, unlike the conventional method. Thus, a transparent film including a flexible film made of a polymer material such as PET may be used as the substrate. A color-variation range and a color-variation causing temperature range may be determined by adjusting a type and a content of a material.

In one example, a thermochromic film for a smart window according to an embodiment of the present disclosure may be manufactured using the method for manufacturing the thermochromic film for a smart window according to an embodiment of the present disclosure.

Figure 2:
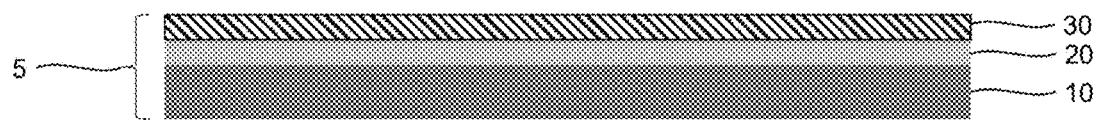
FIG. 2 is a schematic diagram showing a thermochromic film for a smart window according to an embodiment of the present disclosure.

FIG. 2 is a schematic diagram showing a thermochromic film for a smart window according to an embodiment of the present disclosure.

Referring to FIG. 2, a thermochromic film 5 for a smart window according to an embodiment of the present disclosure may include a substrate 10; a metal thin-film layer 20 formed on the substrate 10; and a vanadium dioxide thin-film 30 formed on the metal thin-film layer 20.

Description about each of the components constituting the thermochromic film 5 for the smart window, and a function of each component is the same or similar to the description about each of the components and a function of each component as described in the method for manufacturing the thermochromic film for the smart window.

The substrate 10 is a member that supports other components of the thermochromic film 5 for a smart window according to an embodiment of the present disclosure. As described in the method for manufacturing the thermochromic film for the smart window, even when the substrate is denatured or destroyed at a temperature at which the vanadium dioxide may be synthesized from the vanadium dioxide precursor, the substrate may be coated with the vanadium dioxide. The type of the substrate is not particularly limited. However, in one embodiment, the substrate may include polyethylene terephthalate (PET).

As described in the method for manufacturing the thermochromic film, the metal thin-film layer 20 may function as a reflector. Therefore, as long as the above function is achieved, a type, a size and a shape of the metal thin-film included in the metal thin-film layer 20 are not particularly limited. In one embodiment, the metal thin-film layer 20 may include a thin-film made of one or more metals selected from the group including silver, aluminum, platinum, palladium, and gold. In one embodiment, the metal thin-film layer 20 may include a silver thin-film. Further, as long as the above function is achieved, the thickness of the metal thin-film layer 20 is not particularly limited. In one embodiment, the metal thin-film layer 20 may include a silver thin-film, and may be formed to have a thickness of about 3 to 20 nm. In one embodiment, the metal thin-film layer 20 may include a silver thin-film, and may be formed to have a thickness of about 0.34 to 20 nm, about 1.67 to 20 nm, about 3.34 to 20 nm, or about 10 to 20 nm.

The vanadium dioxide thin-film 30 may exhibit thermochromic properties based on the phase transition. Thus, the vanadium dioxide thin-film 30 is a member capable of imparting the thermochromic ability to the thermochromic film for a smart window according to an embodiment of the present disclosure. Therefore, as long as the above function is achieved, the scope of the present disclosure does not exclude the inclusion of a material other than the vanadium dioxide into the thin-film 30. In one embodiment, the vanadium dioxide thin-film 30 may further contain tungsten. As mentioned above, the inclusion of tungsten doping may change the phase transition temperature of vanadium dioxide. Therefore, a content of tungsten may be determined based on the target phase transition temperature. In one embodiment, the vanadium dioxide thin-film 30 may further contain tungsten at about 0.75 mol % or smaller. For manufacturing the film exhibiting thermochromic properties at room temperature, the tungsten may be contained in the above content range.

In one embodiment, the thermochromic film for the smart window may be thermochromic at a temperature of about 30 to 75° C. In another embodiment, the thermochromic film for the smart window may be thermochromic at a temperature of about 15 to 75° C. For example, the thermochromic film for the smart window may be thermochromic at a temperature of about 30 to 40° C., about 30 to 35° C., about 30 to 45° C., about 35 to 40° C., or about 35 to 45° C. In one embodiment, the thermochromic film for the smart window may change a color thereof based on change in infrared ray transmittance and luminous transmittance at a temperature of about 30 to 35° C. In one embodiment, the color-variation of the thermochromic film for the smart window may occur at a temperature of about 30 to 35° C. The color-variation causing temperature range of the thermochromic film as described above may depend on the tungsten content range. In one embodiment, the tungsten content range may be determined to achieve a target color-variation causing temperature range of the thermochromic film. In the above temperature range, the phase transition of vanadium dioxide included in the thermochromic film may occur.

In the context of the present disclosure, "color-variation" means a property in which when light transmits through or is reflected from the thermochromic film, a color of the light changes, that is, a phenomenon in which transmittance or reflectance based on a wavelength of incident light changes. In defining the color-variation, the change in the transmittance or reflectance based on the wavelength may be arbitrary and relative. For example, when light is recognized by a device, and a color change is equal or larger than a predetermined value or a deviation of the color change is equal or larger than a predetermined value, it may be interpreted that the color-variation occurs. In another example, when light is perceived by the naked eye, and a reference observer or a predetermined number of observers among a group of observers perceives color-change, it may be interpreted that the color-variation occurs.

As described above, the color-variation range and the color-variation causing temperature range of the thermochromic film for a smart window according to the embodiment of the present disclosure may be determined so as to have a practical transmittance at room temperature.

Figure 3:
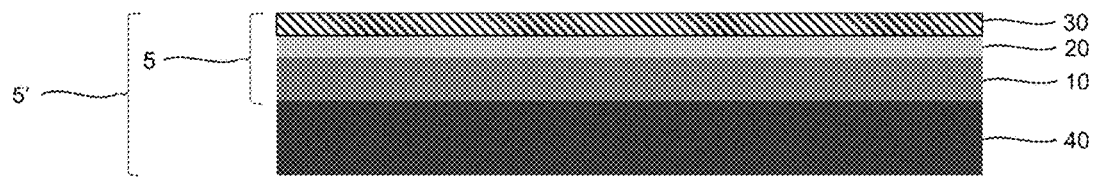
FIG. 3 is a schematic diagram showing a smart window according to an embodiment of the present disclosure.

FIG. 3 is a schematic diagram showing a smart window according to an embodiment of the present disclosure.

Referring to FIG. 3, a smart window 5' according to an embodiment of the present disclosure includes a window substrate 40; and the thermochromic film 5 for the smart window attached to at least one face of the window substrate 40.

The window substrate 40 is a substrate generally used as a window in the art, and may be transparent, translucent, or partially opaque. Non-limiting examples of the window substrate 40 may include glass or acrylate.

FIG. 3 shows that the thermochromic film 5 for the smart window is attached to one face of the window substrate 40. However, this is an example, and the thermochromic film 5 for the smart window may be attached to one face thereof or may be attached onto each of both opposing faces. Alternatively, a stack of thermochromic films may be attached to one face or on both opposing faces thereof.

As described above, the smart window according to the embodiment of the present disclosure in which the thermochromic film 5 for the smart window is attached to one face of the window substrate 40 or both opposing faces thereof may replace a general window.

Hereinafter, Example of the present disclosure will be described in detail. However, Example as described below is merely an example of the present disclosure, and a scope of the present disclosure is not limited to the following Example.

Manufacturing of Thermochromic Film

A PET film was selected as a flexible substrate. Monoclinic vanadium dioxide, polyvinylpyrrolidone and isopropyl alcohol were mixed with each other to prepare a dispersion solution for formation of a coating film.

Red: 0.03 g of $VO_2(M)$ powders and 0.1 g of polyvinylpyrrolidone were added to 3 ml of isopropyl alcohol.

Light green: 0.02 g of $VO_2(M)$ powders and 0.1 g of polyvinylpyrrolidone were added to 2 ml of isopropyl alcohol.

Yellow: 0.03 g of $VO_2(M)$ powders and 0.05 g of polyvinylpyrrolidone were added to 2 ml of isopropyl alcohol.

Purple: 0.03 g of VO$_2$(M) powders and 0.1 g of polyvinylpyrrolidone were added to 3 ml of isopropyl alcohol.

Each of the dispersion solutions is dispersed using a sonicator. A silver reflective film with a thickness of 20 to 25 nm was deposited on the transparent PET film using a sputter. 0.5 ml of each of the dispersion solutions was applied on the silver reflective film using spin-coating at 1000 rpm for 10 seconds. The applied dispersion solution was dried naturally for 10 minutes or greater. Thus, a thermochromic film was manufactured.

TEM/XRD Analysis

Figure 4A:
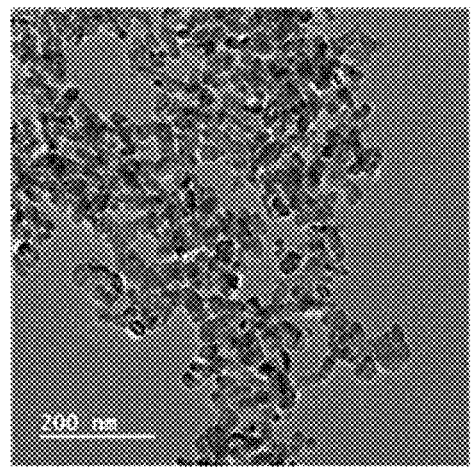
FIG. 4A and FIG. 4B are a TEM image and an XRD graph of monoclinic vanadium dioxide nanoparticles doped with 0.5% tungsten, respectively.
Figure 4B:
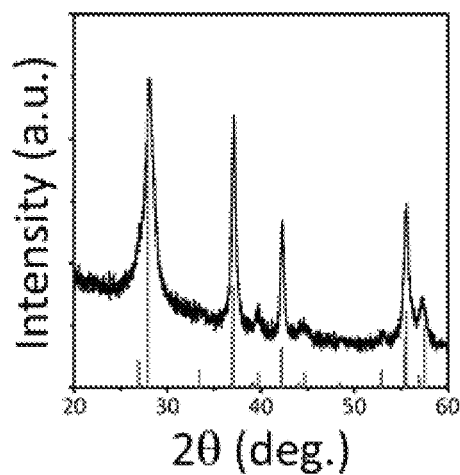
Figure 5B:
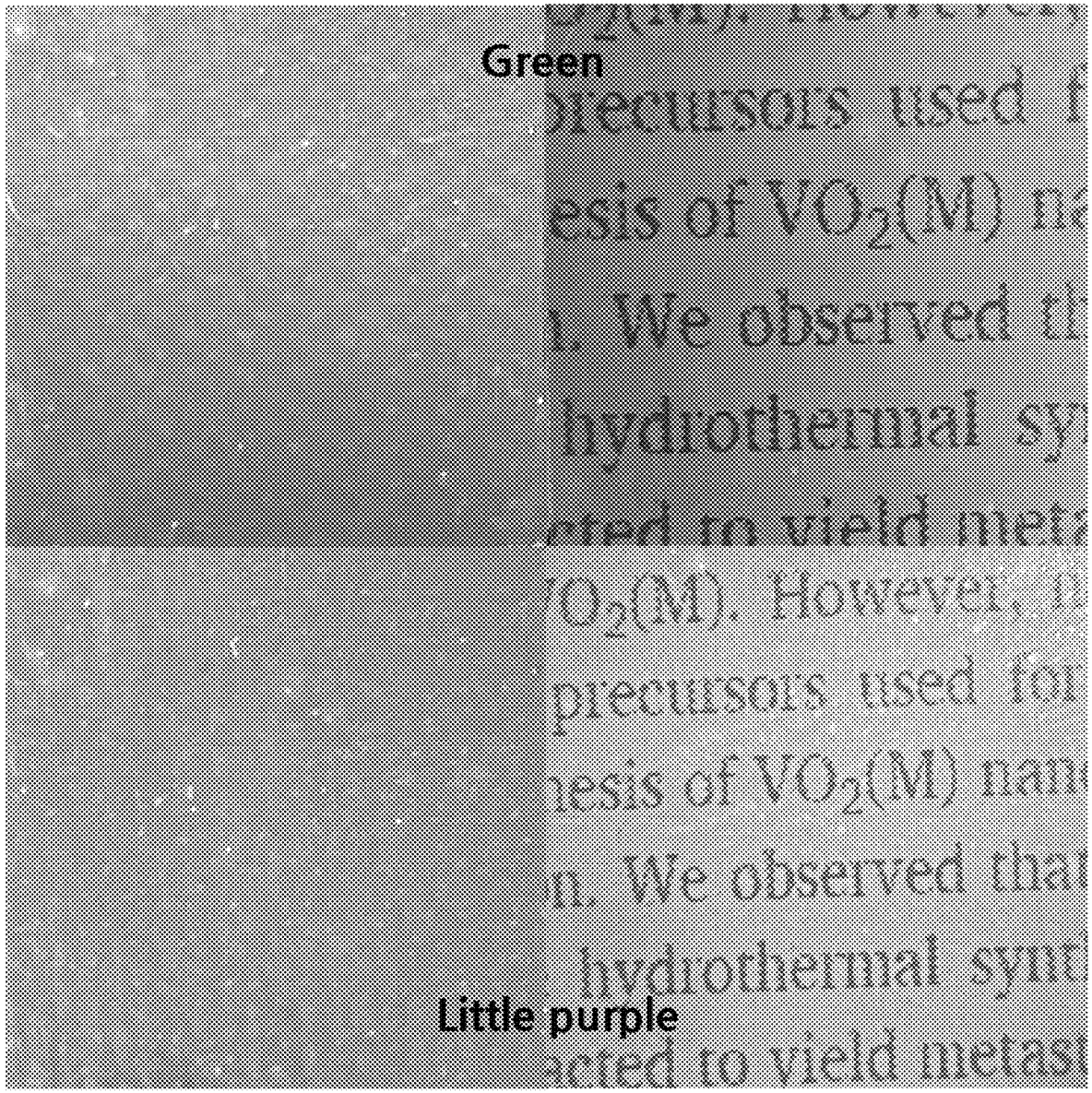
Figure 5D:
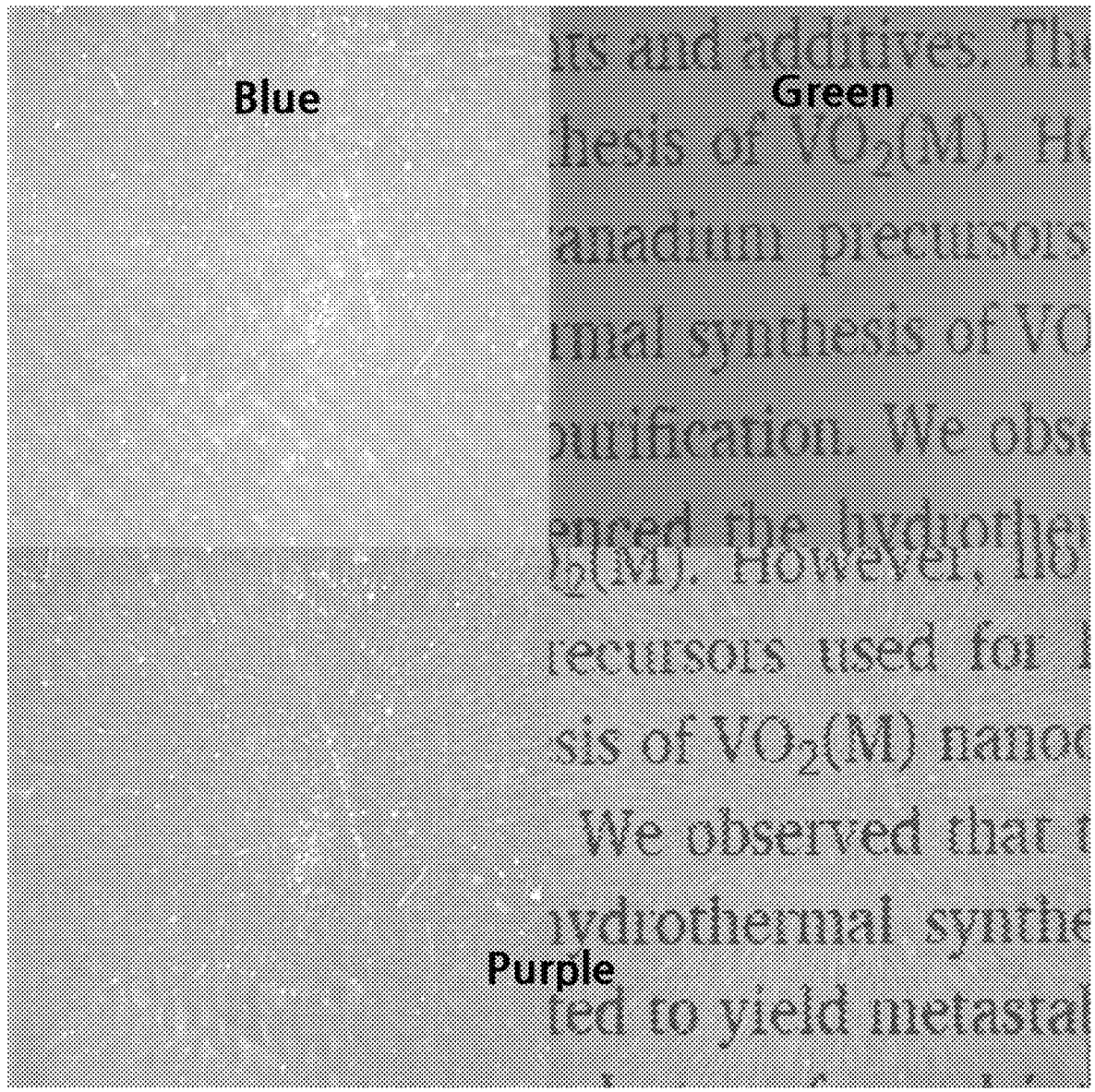

TEM and XRD analysis were performed to identify a shape and a crystal structure of monoclinic vanadium dioxide nanoparticles doped with 0.5% tungsten. FIG. 4A is a TEM image and FIG. 4B is an XRD graph. A film doped with 0.5% tungsten was selected as a sample. Referring to FIG. 4A and FIG. 4B, it is identified that a size of the vanadium dioxide particle is in a range of about 30 to 50 nm, and the vanadium dioxide particle has a monoclinic structure.

Analysis of Color-variation Characteristics Based on Silver Film Thickness

We analyzed the color-variation characteristics based on the thickness of the sliver thin-film layer with the naked eye. FIG. 5A to FIG. 5D are diagrams showing the results. FIG. 5A to FIG. 5D are color-variation photographs at high and low temperatures when the silver deposition thickness is 0.34 nm, 1.67 nm, 3.34 nm and 10 nm, respectively. The thermochromic phenomenon is not observed when the thickness thereof is 3 nm or smaller, while the color expression is conspicuous when the thickness thereof is 10 nm or larger. The thickness of the silver thin-film was measured using AFM. Further, the thickness was estimated in proportion to a sputtering time. Luminous transmittance ($T_{lum}$) based on the silver thin-film thickness is shown in Table 1 below.

TABLE 1

| Thickness (nm) | $T_{lum}$(%) |
| --- | --- |
| 0.34 | 91.02 |
| 1.67 | 71.29 |
| 3.34 | 67.85 |
| 10 | 50.08 |
| 20 | 23.5 |
| 60 | 2.17 |
| 100 | 0.038 |

Color-Variation Analysis with Naked Eye

Figure 6A:
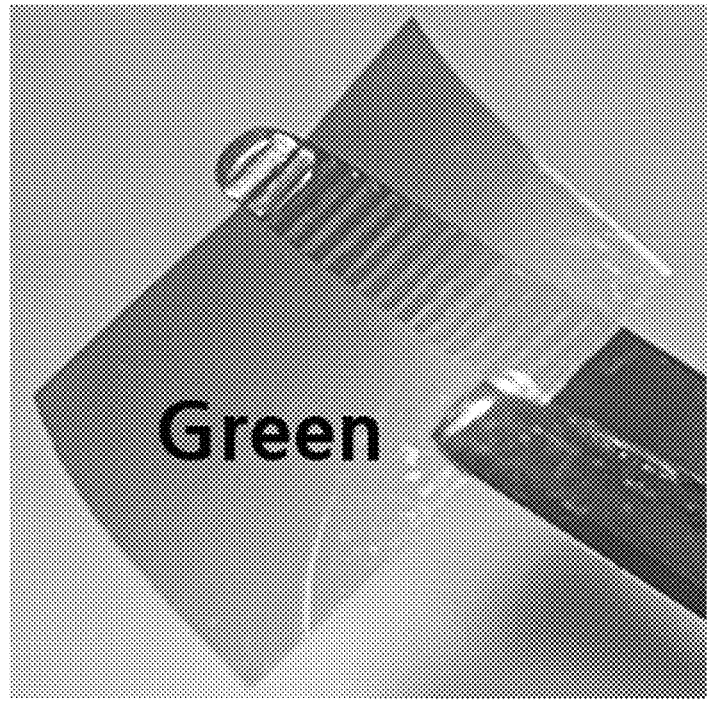
FIG. 6A and FIG. 6B are photographs before and after thermochromism, respectively, occurring when a thermochromic film for a smart window according to an embodiment of the present disclosure is bent, under LED flashlight.
Figure 6B:
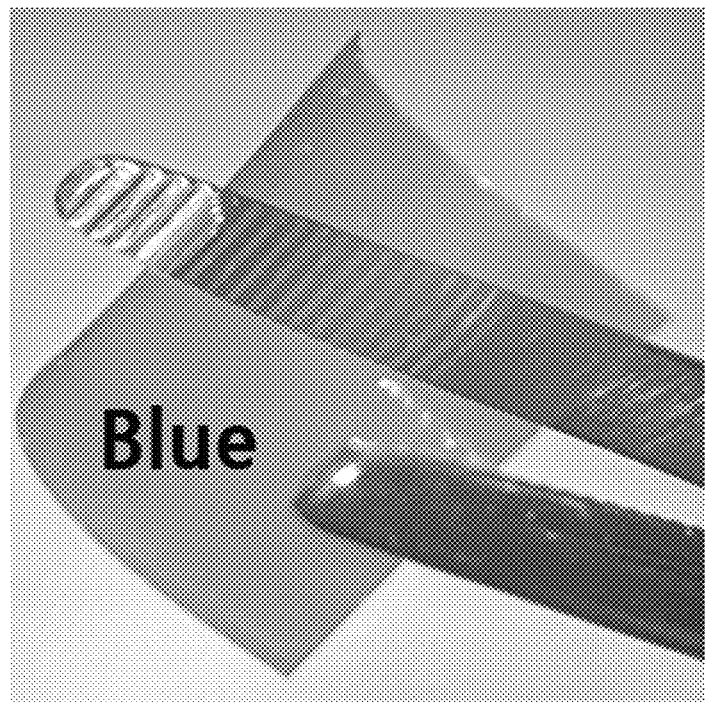
Figure 7A:
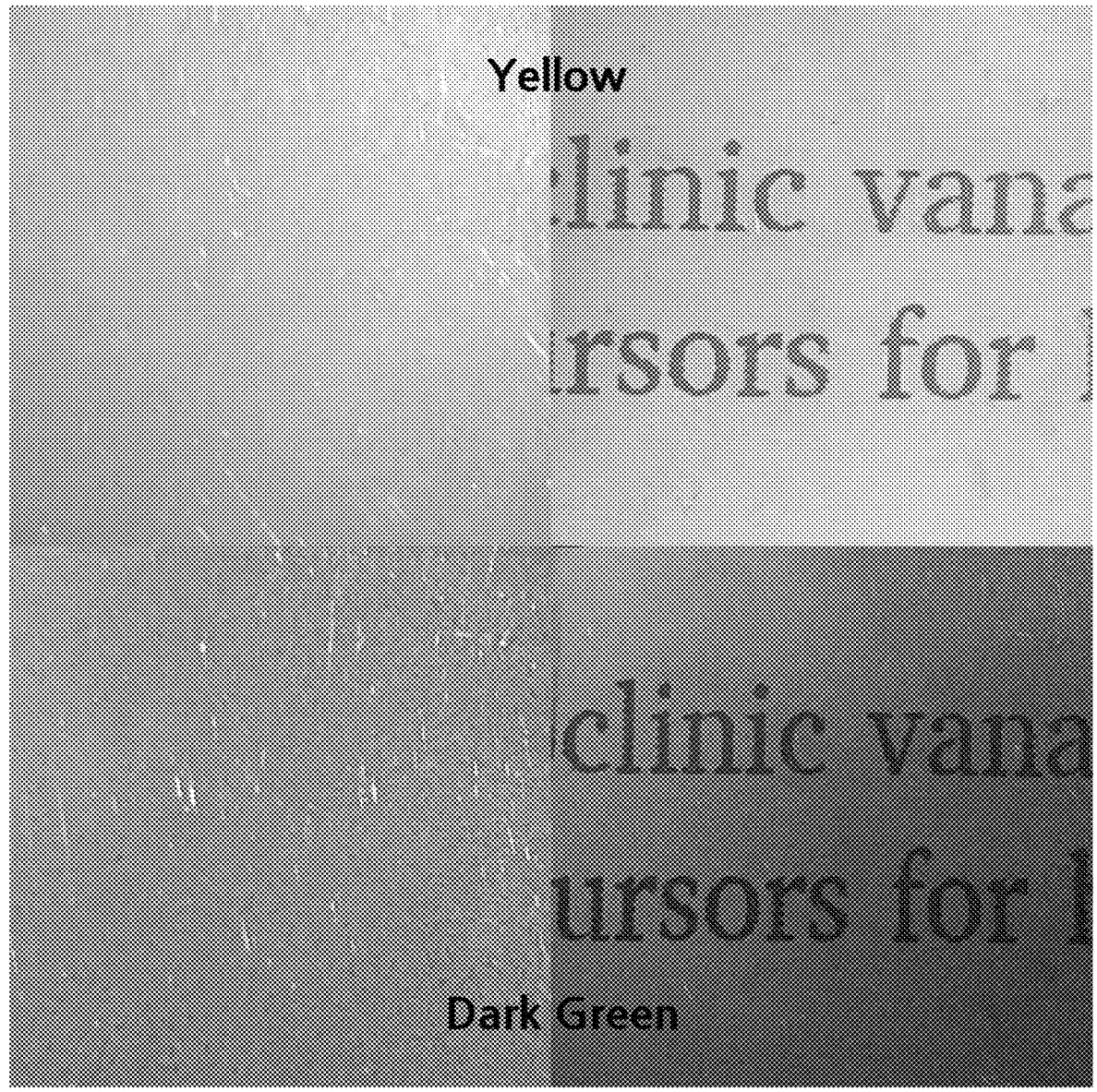
FIGS. 7A to 7D are color-variation photographs at high and low temperatures of a thermochromic film for a smart window according to an embodiment of the present disclosure when a vanadium dioxide thin-film is deposited to have thicknesses of 280 nm, 350 nm, 380 nm, and 530 nm, respectively.
Figure 7B:
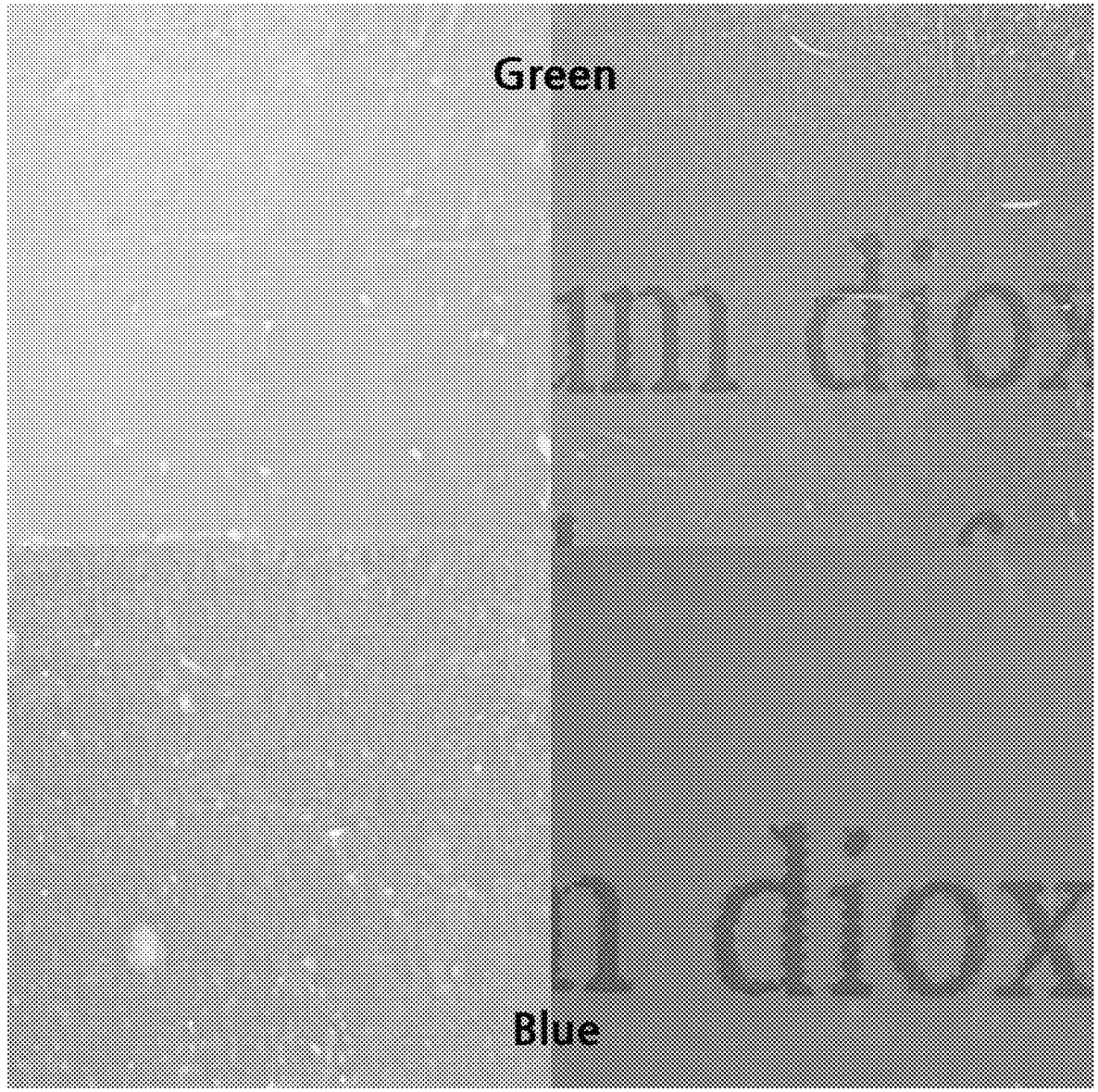
Figure 7C:
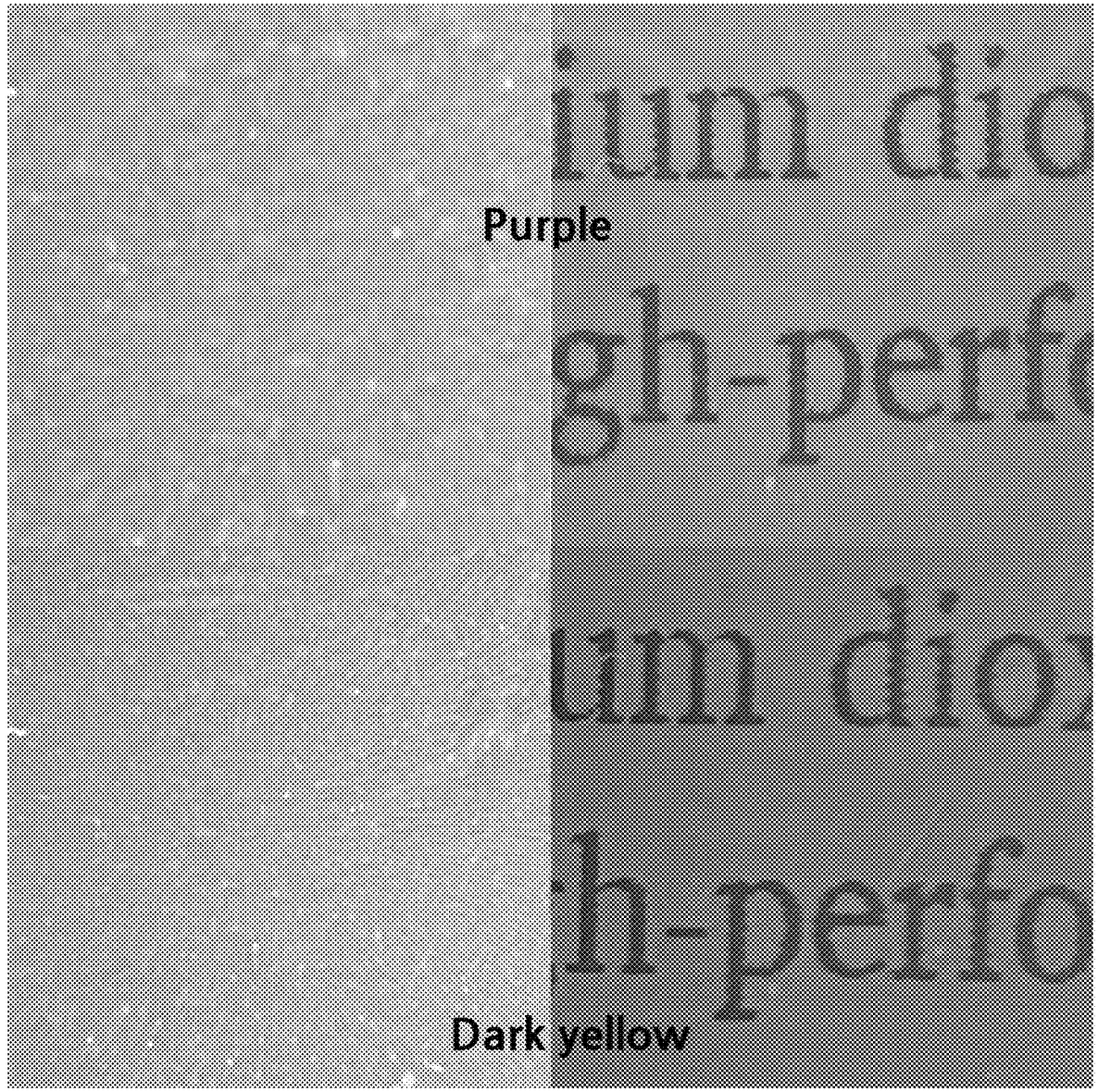
Figure 7D:
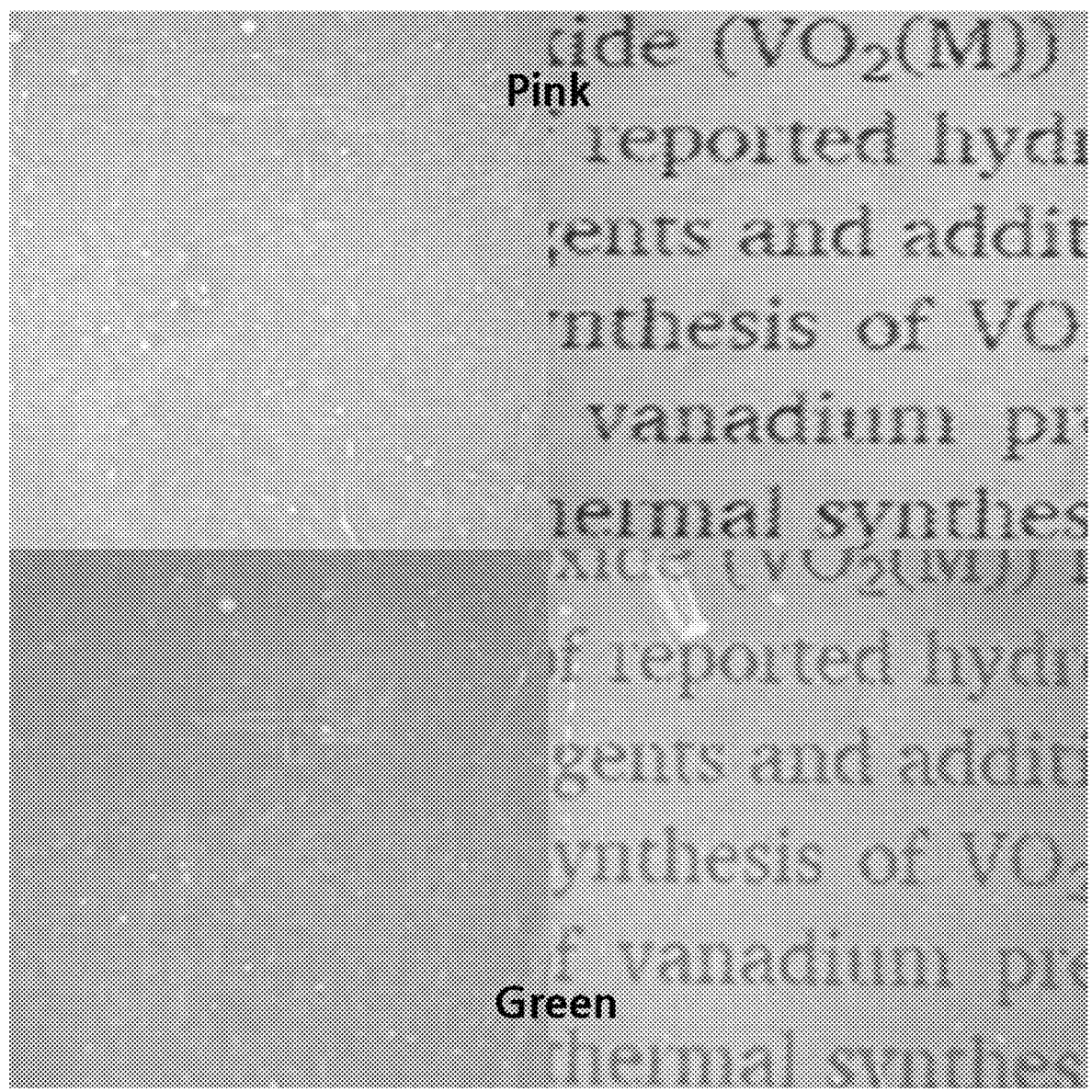

The thermochromic phenomenon of the manufactured thermochromic film was observed with the naked eye. The thermochromic film was observed under a LED flashlight in a bent state. FIG. 6A is a photograph taken before the thermochromic phenomenon occurs. FIG. 6B is a photograph taken after the thermochromic phenomenon occurs.

Analysis of Color-Variation Characteristics 1

Figure 8A:
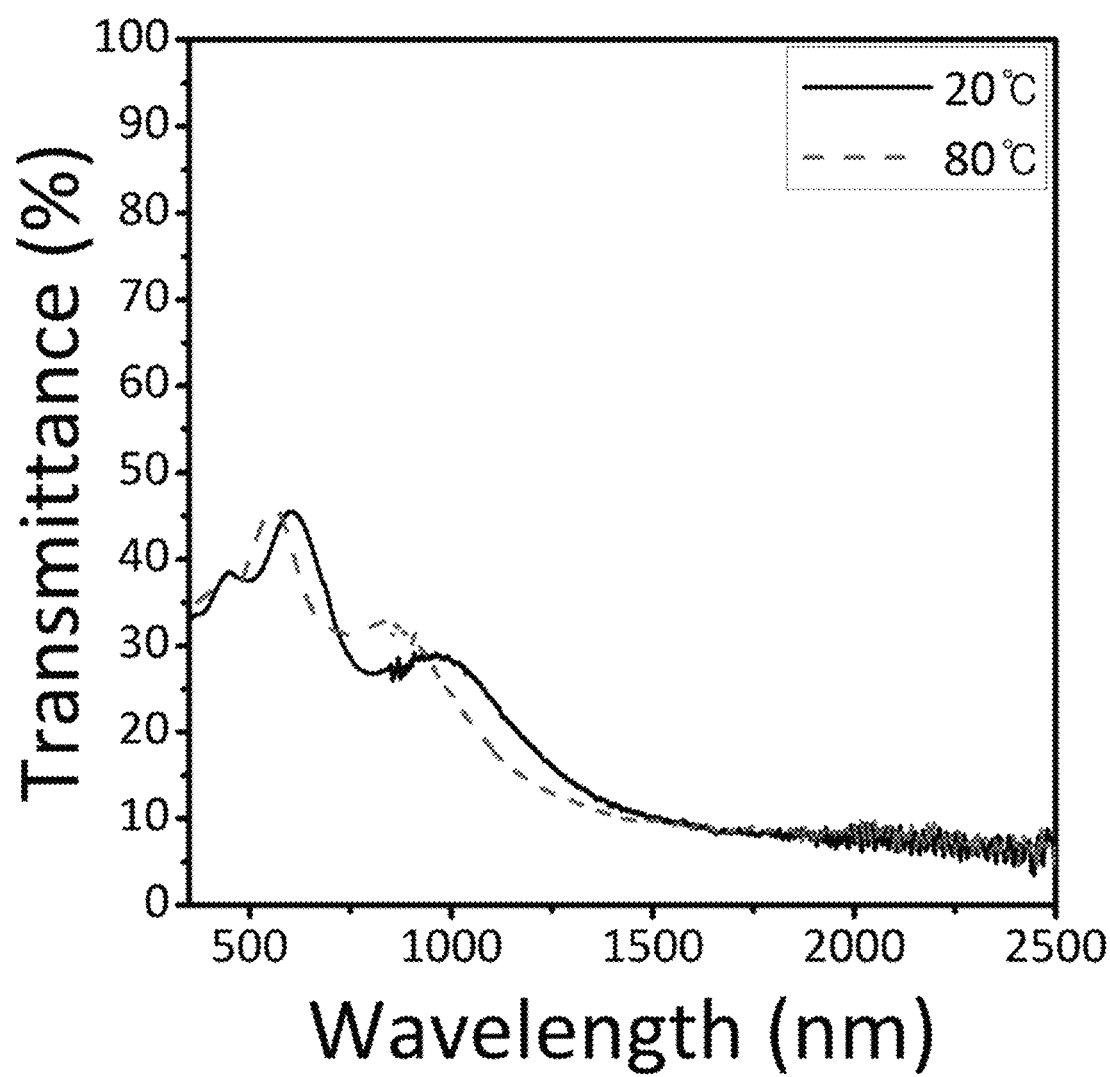
FIG. 8A to FIG. 8C are graphs showing transmittance, reflectance, and absorption based on a temperature when a vanadium dioxide thin-film is deposited to have a 500 nm thickness.
Figure 8B:
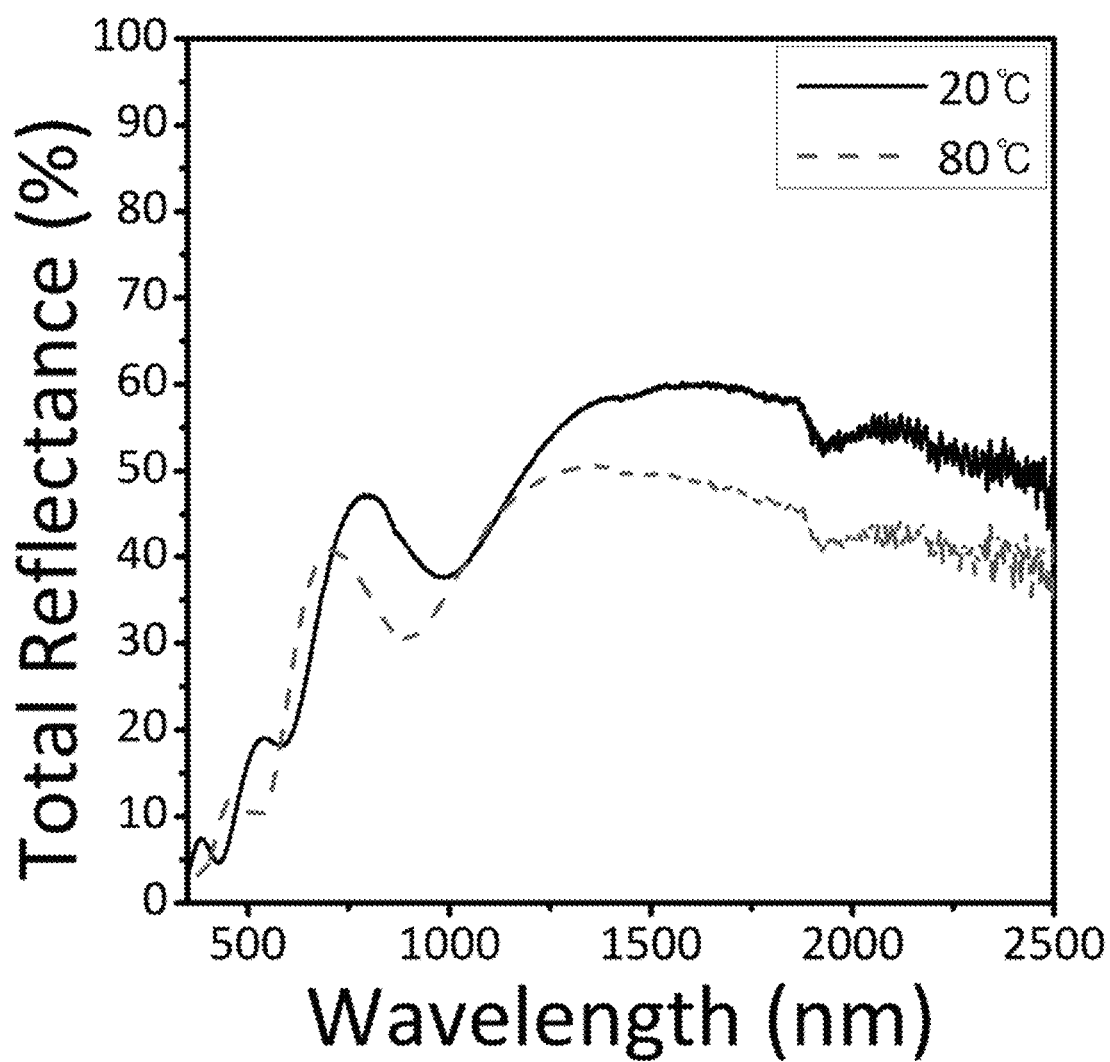
Figure 8C:
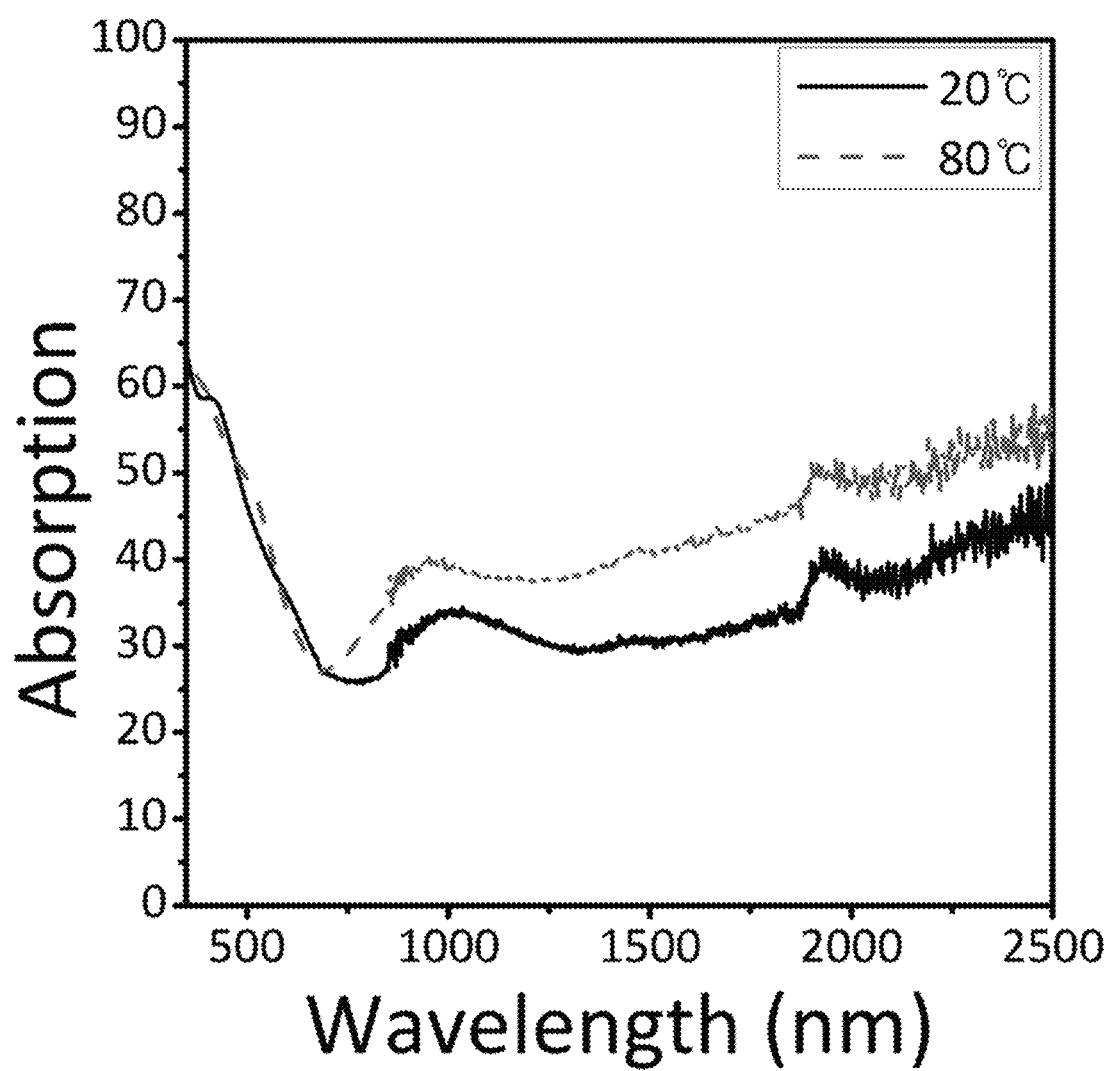
Figure 9A:
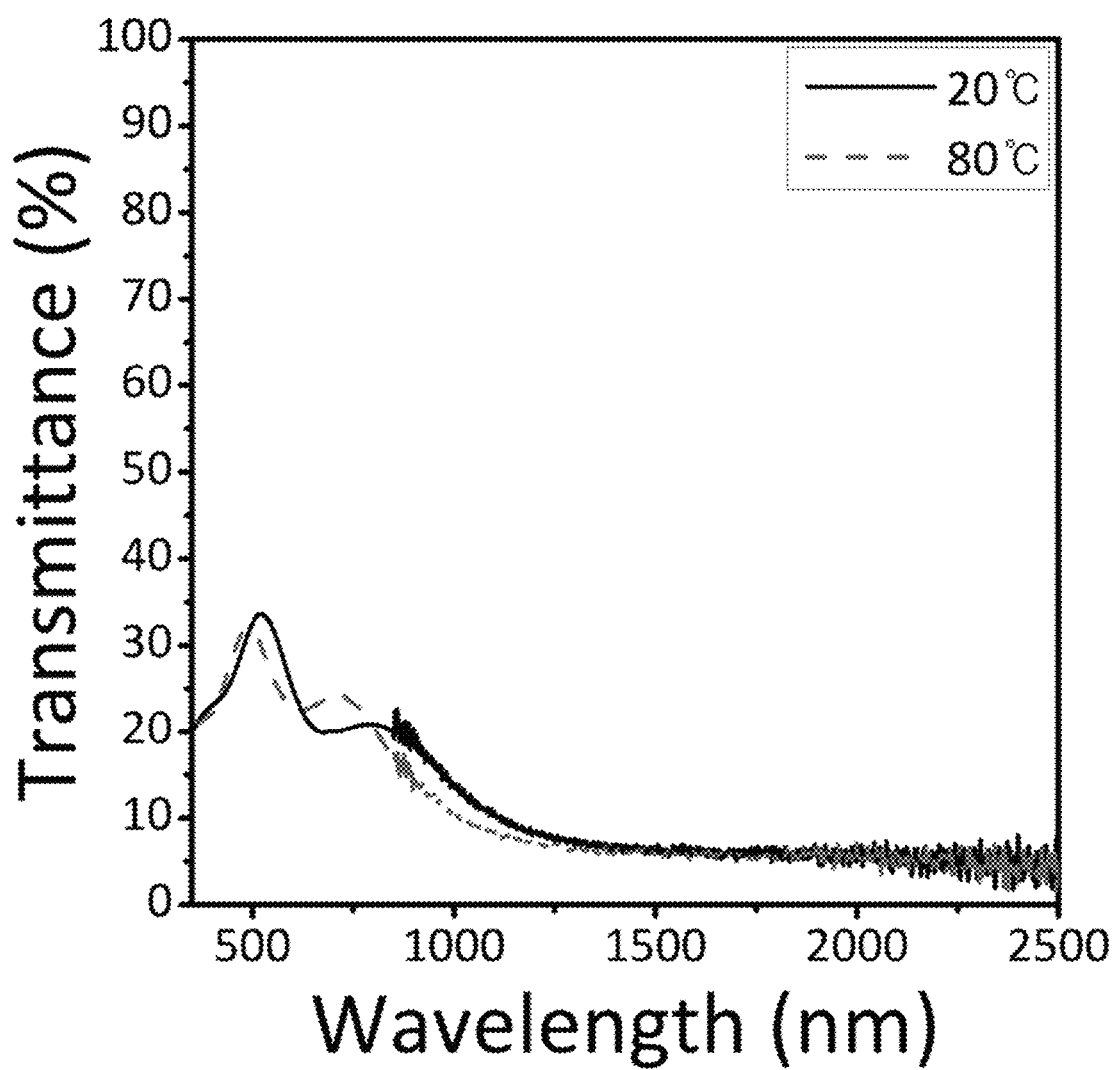
FIG. 9A to FIG. 9C are graphs showing transmittance, reflectance, and absorption based on a temperature when a vanadium dioxide thin-film is deposited to have a 400 nm thickness.
Figure 9B:
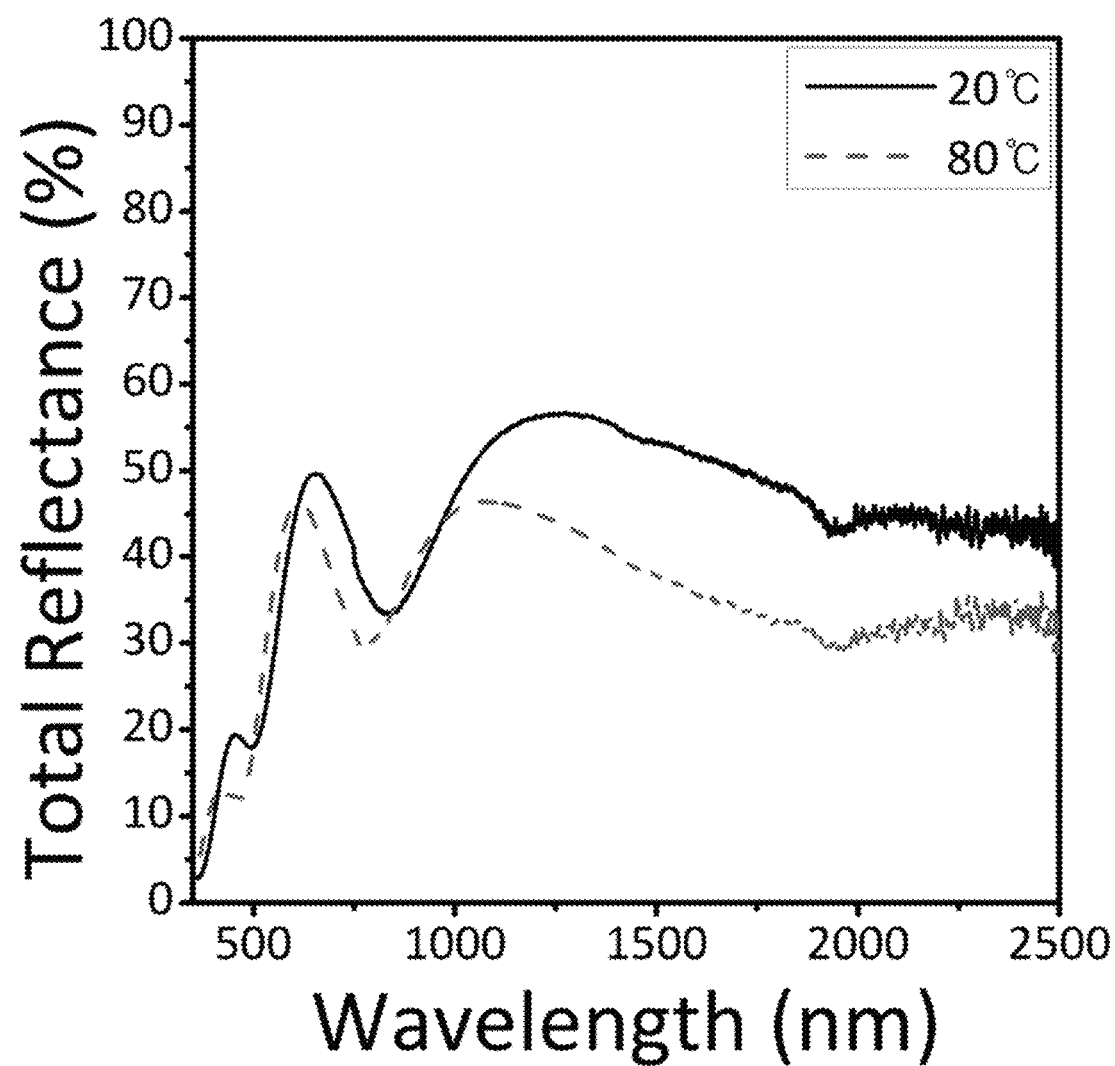
Figure 9C:
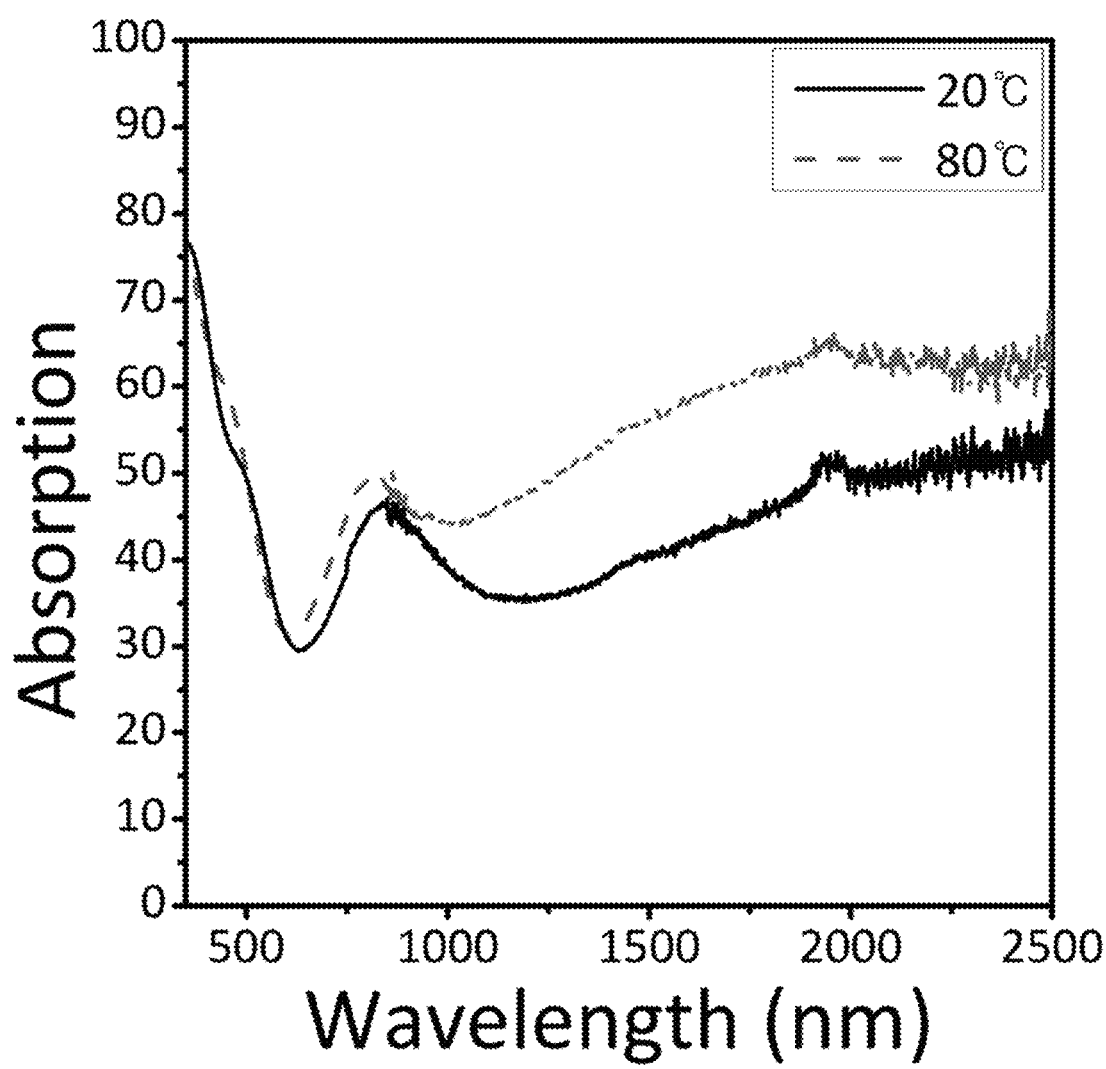
Figure 10A:
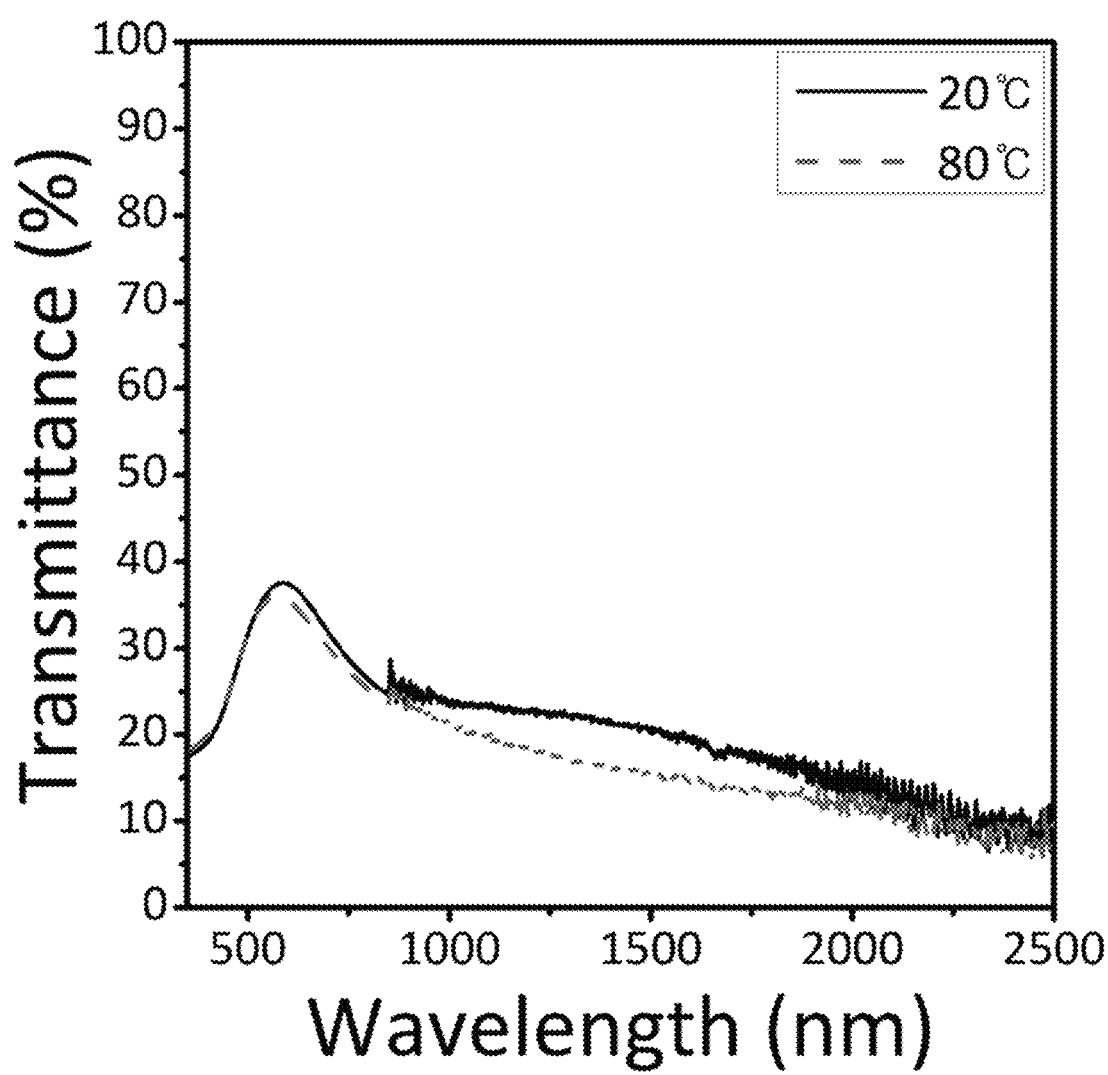
FIG. 10A to FIG. 10C are graphs showing transmittance, reflectance, and absorption based on a temperature when a vanadium dioxide thin-film is deposited to have a 250 nm thickness.
Figure 10B:
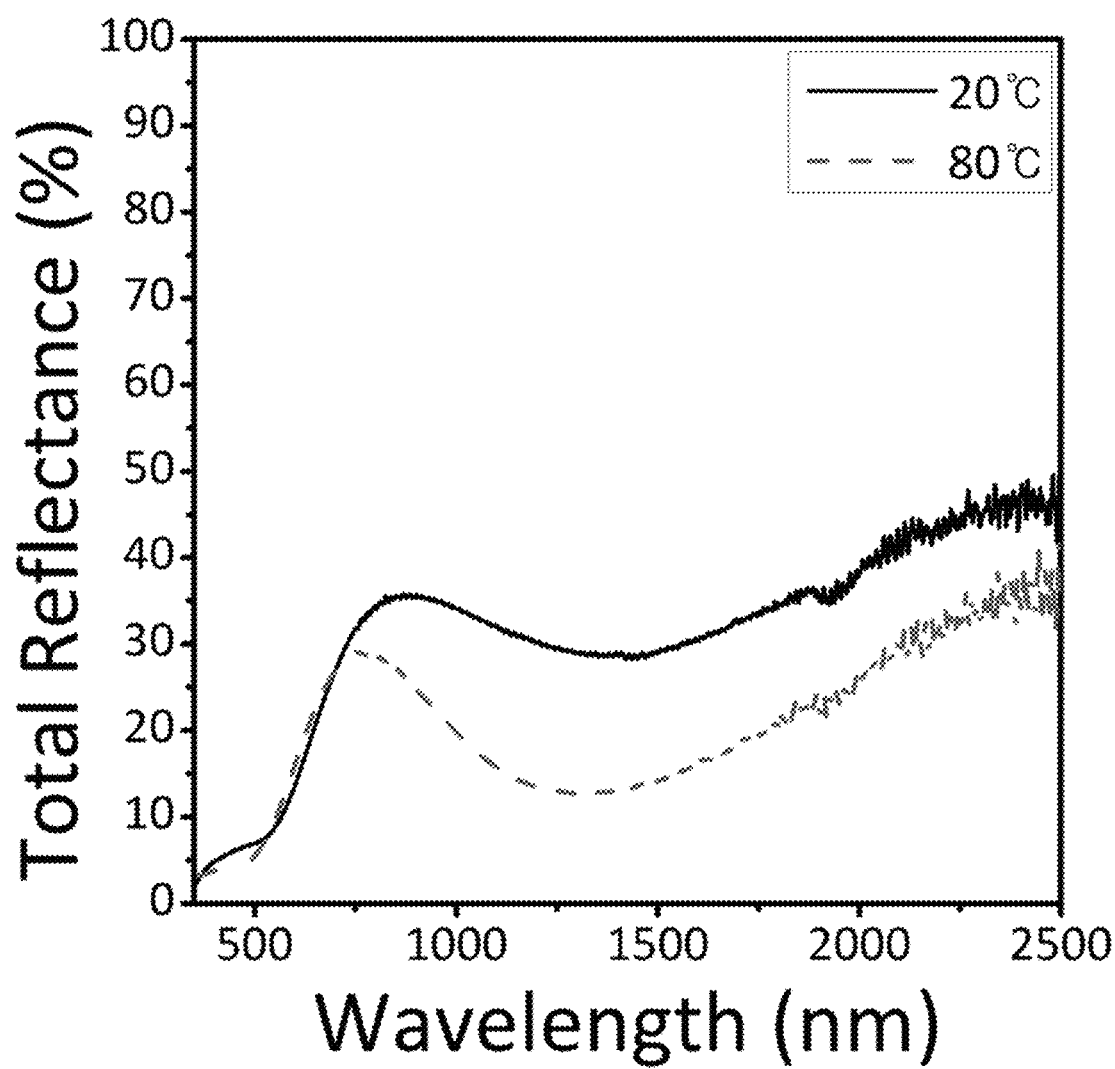
Figure 10C:
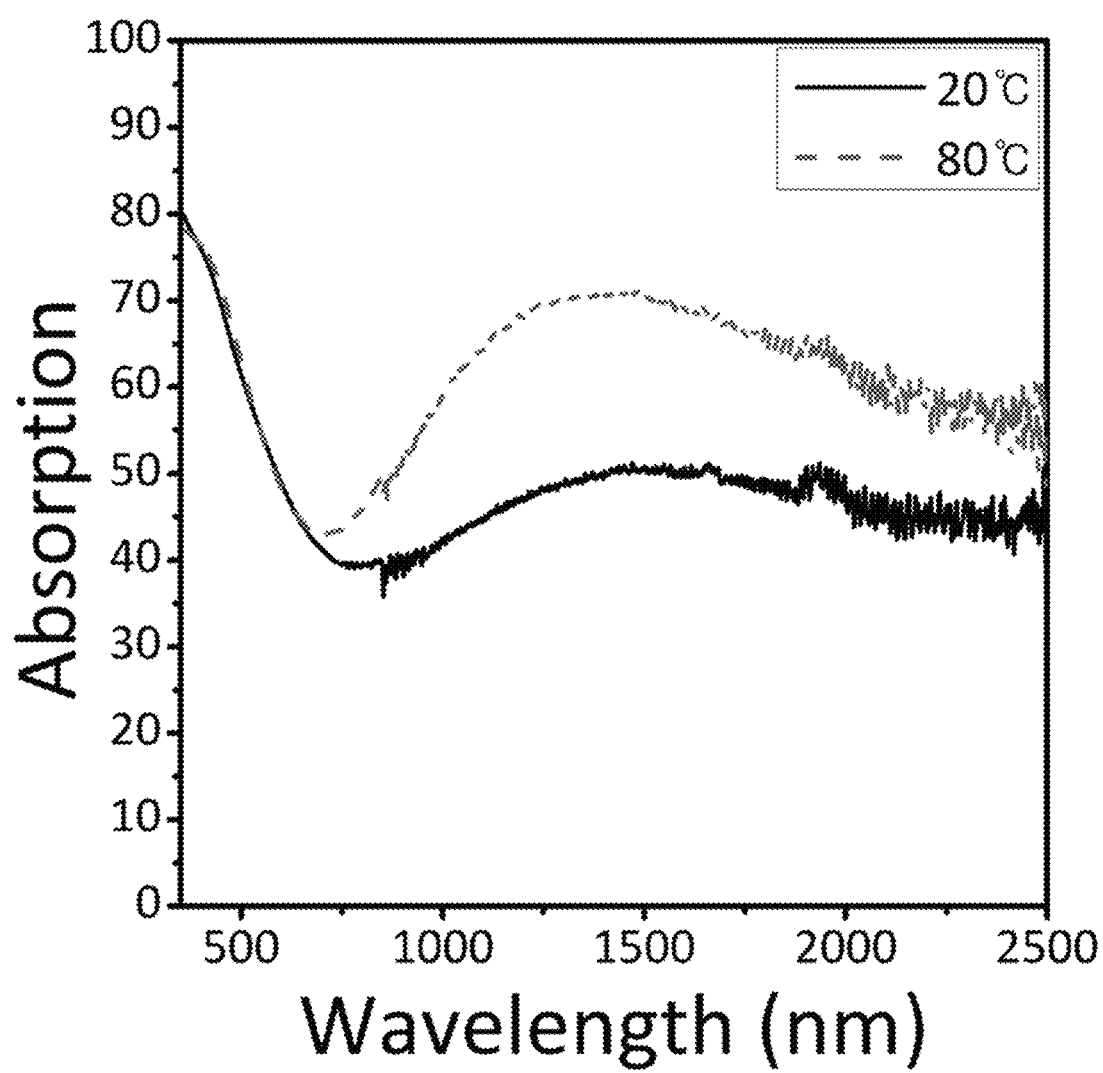
Figure 11A:
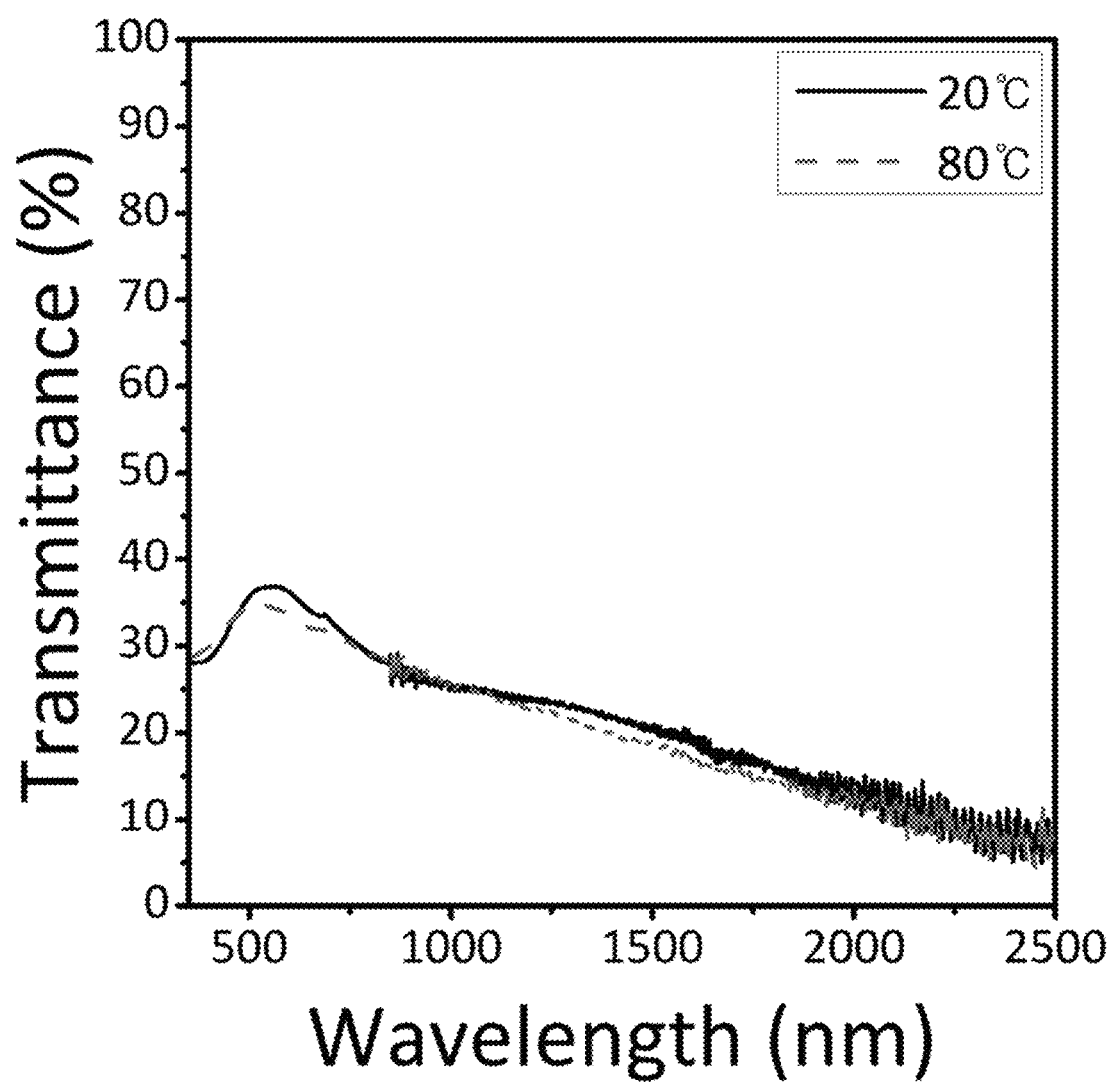
FIG. 11A to FIG. 11C are graphs showing transmittance, reflectance, and absorption based on a temperature when a vanadium dioxide thin-film is deposited to have a 300 nm thickness.
Figure 11B:
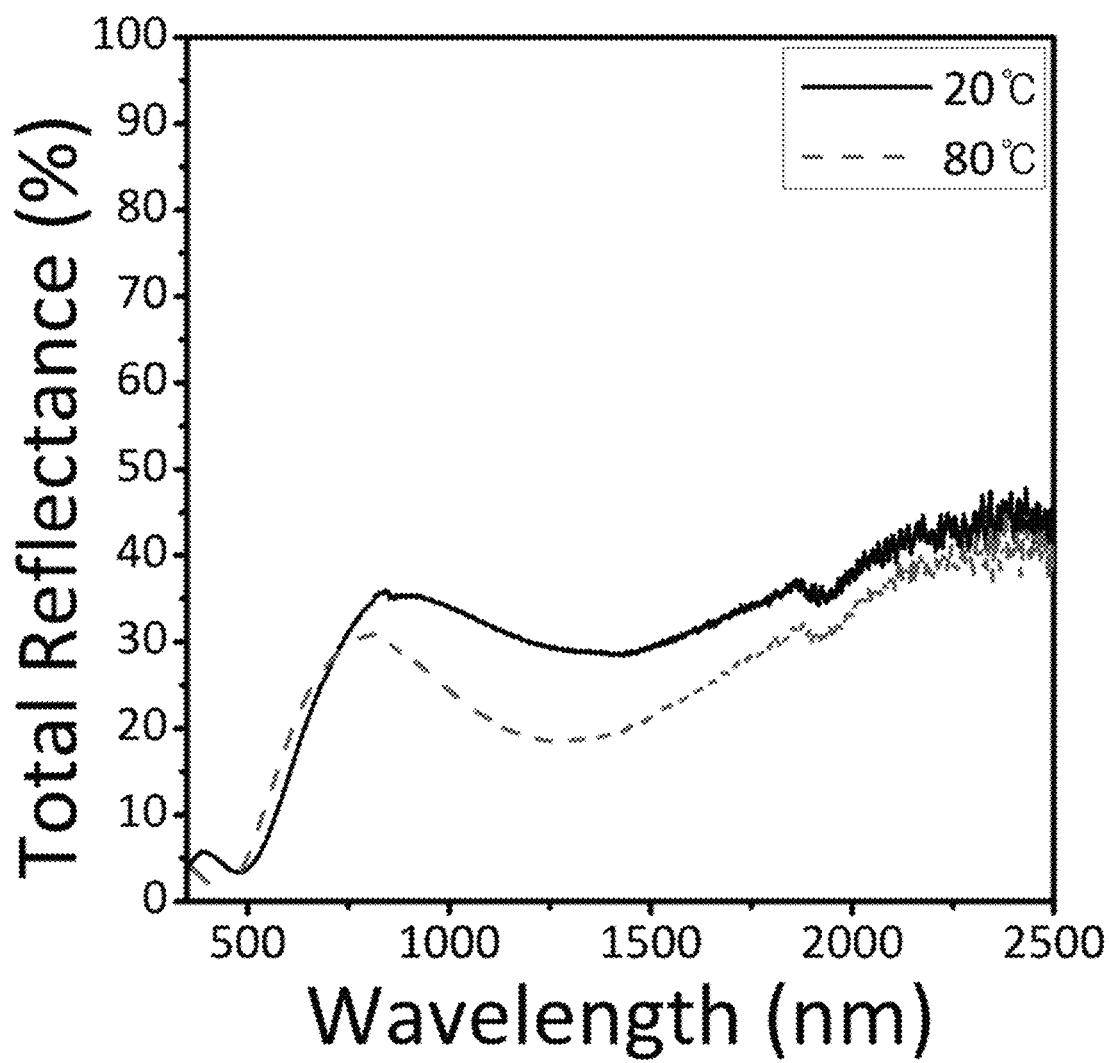
Figure 11C:
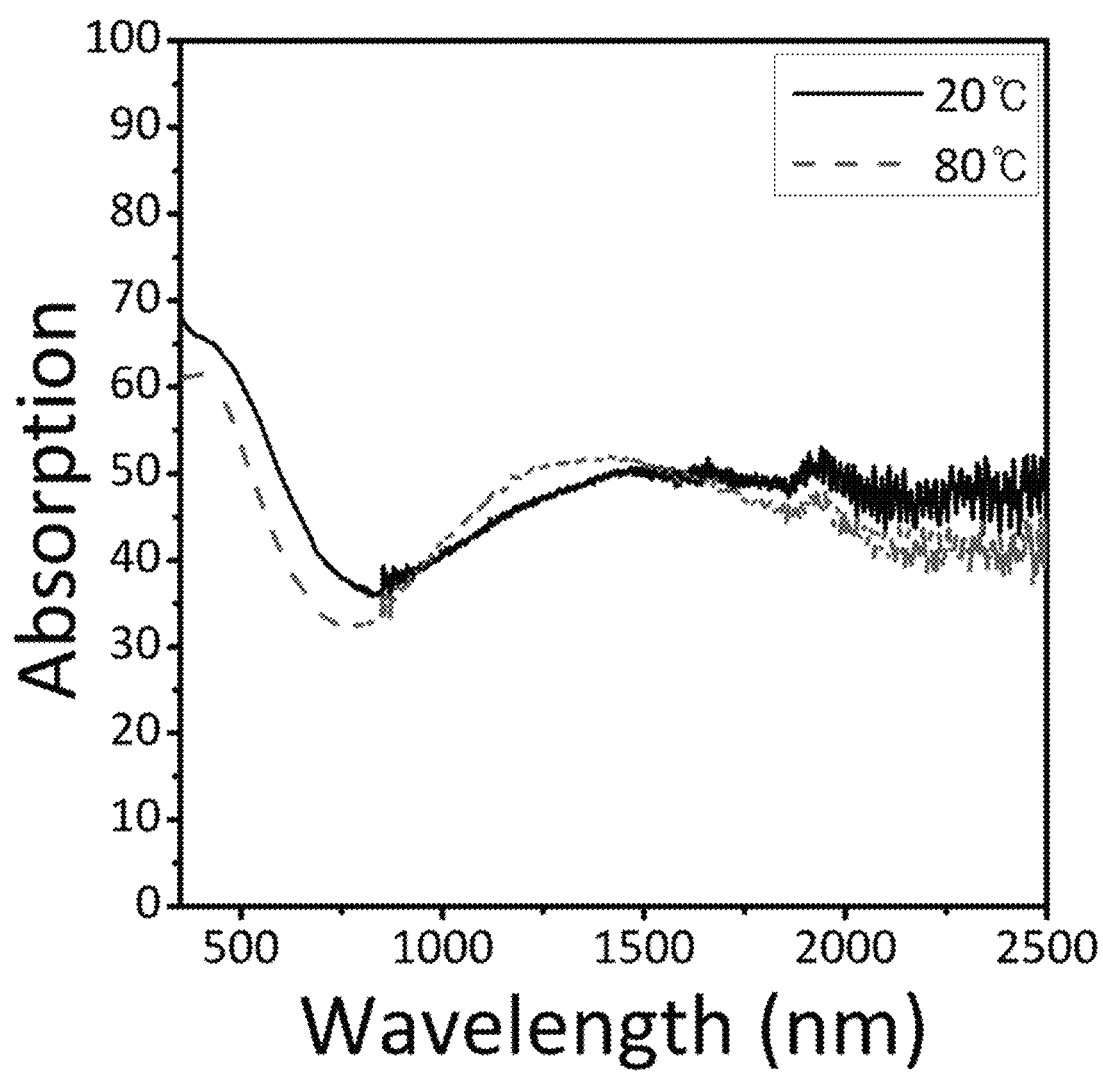
Figure 12B:
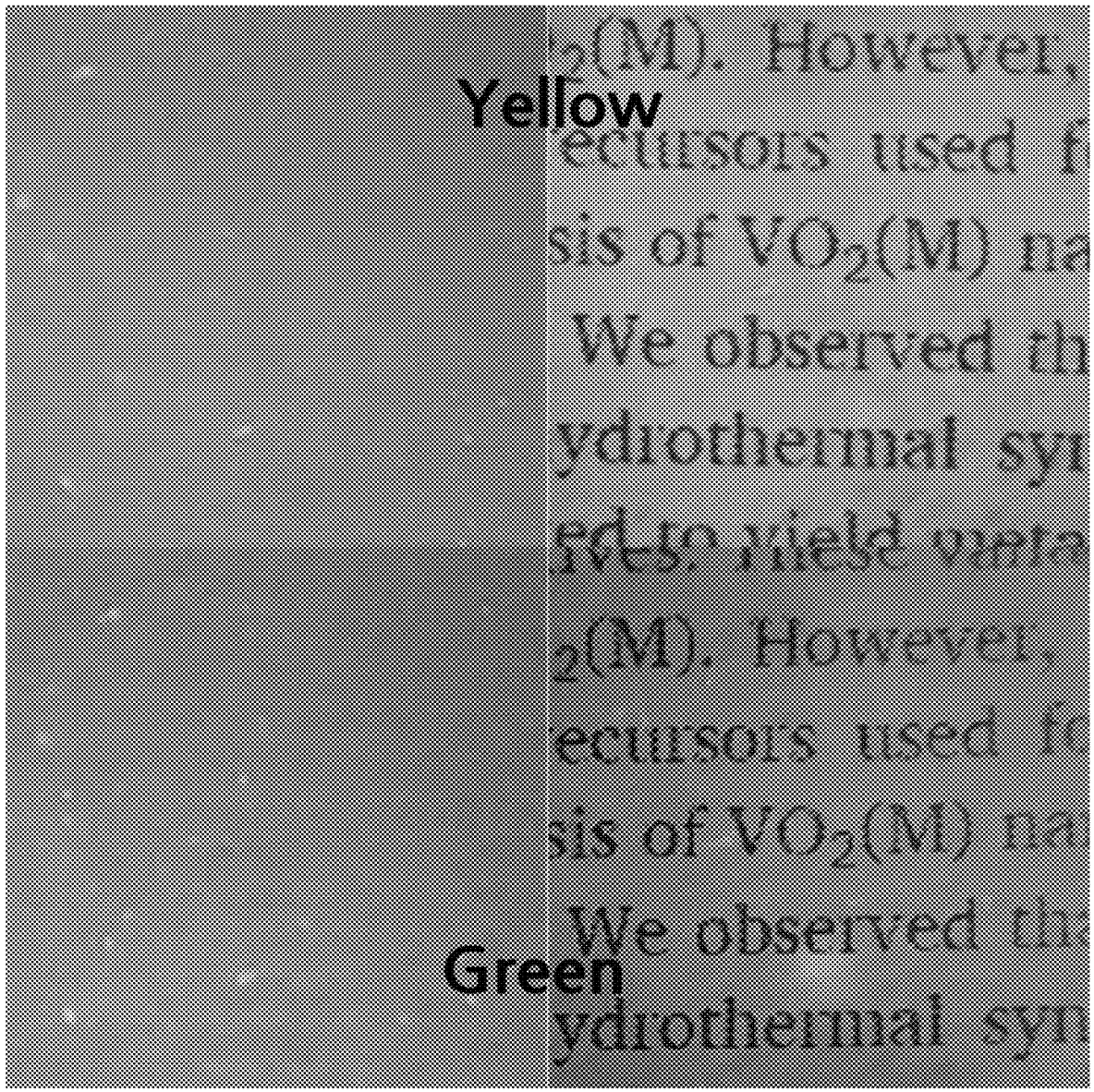
Figure 12C:
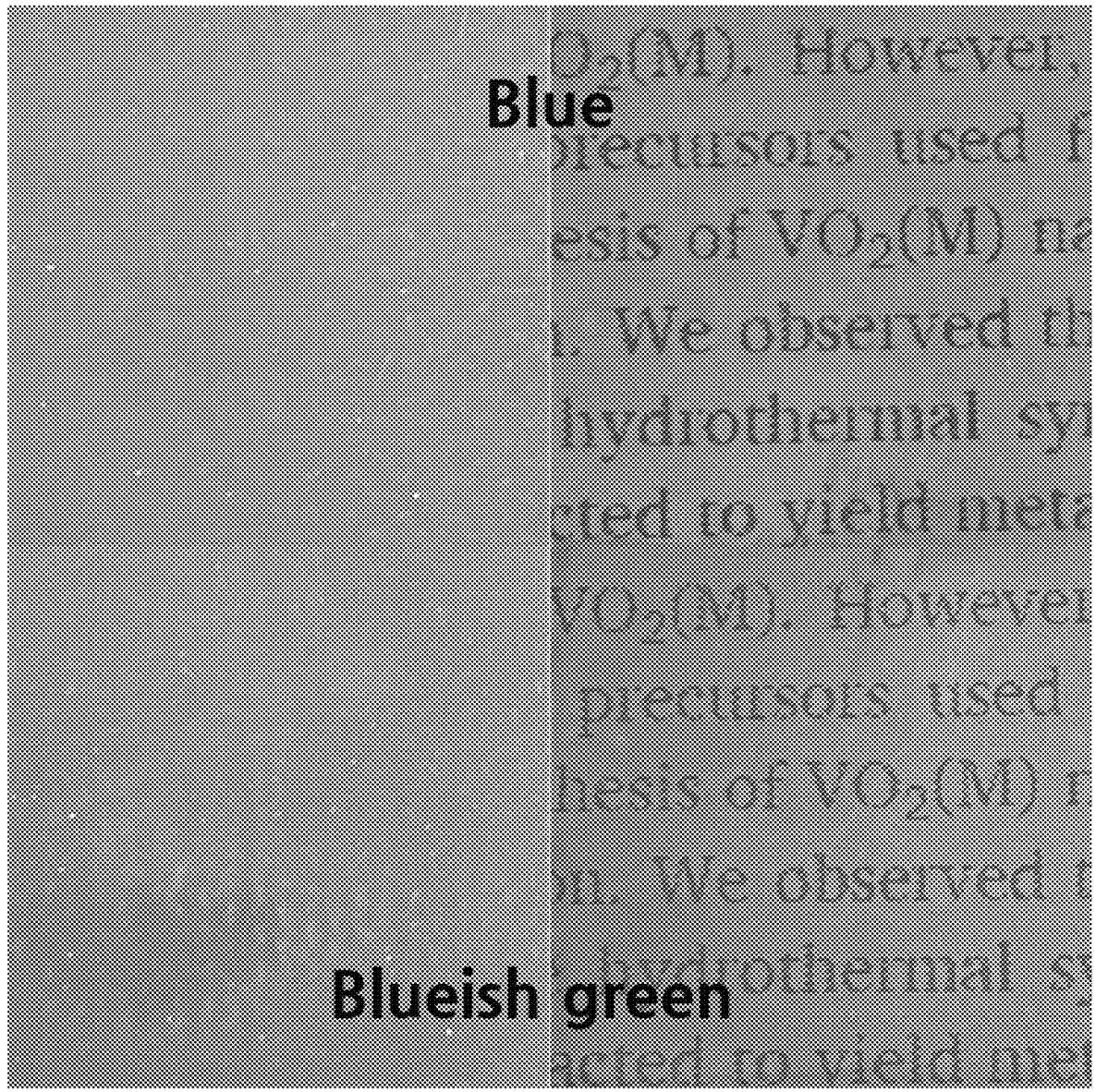
Figure 12D:
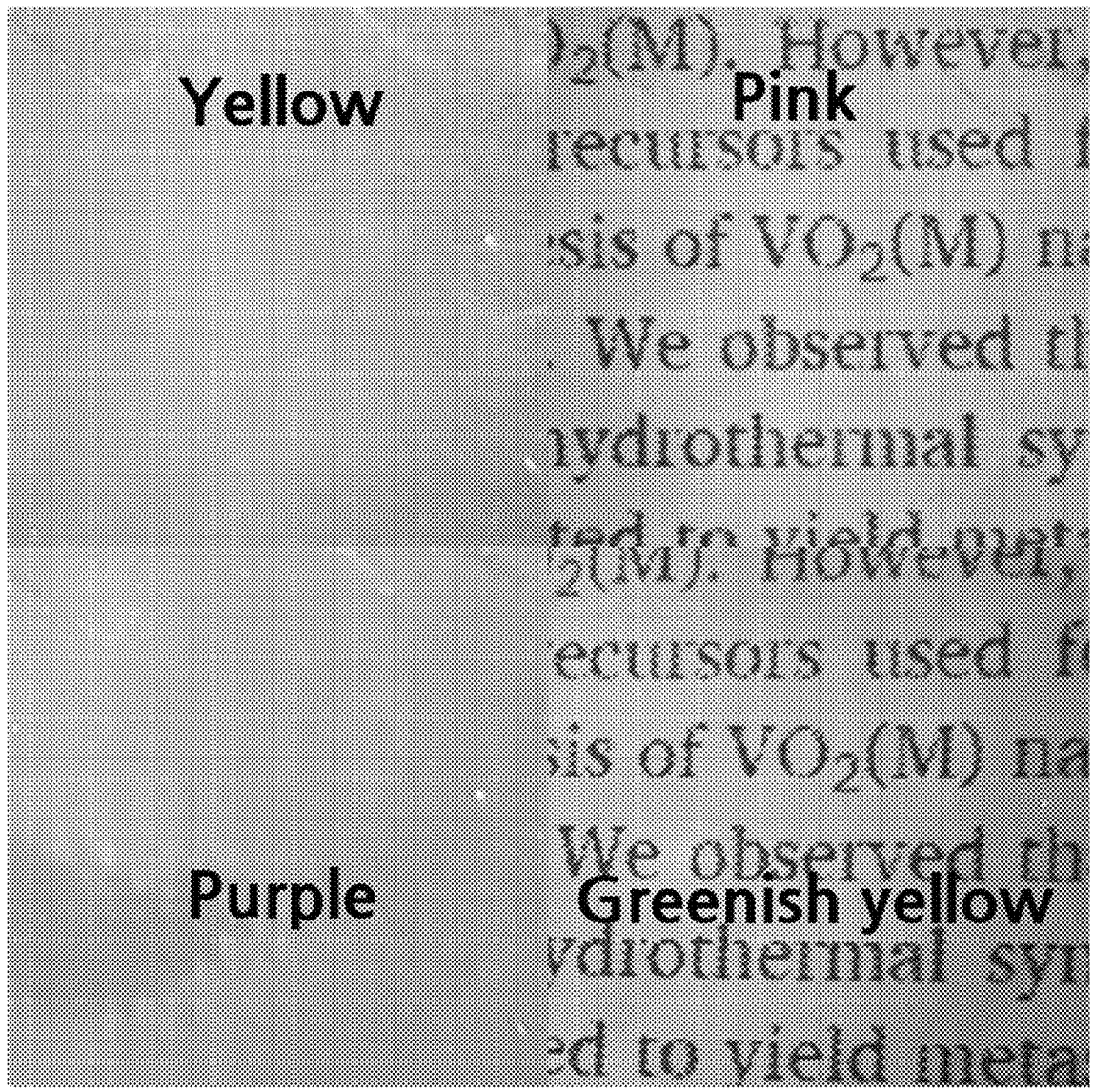

The thermochromic phenomenon, transmittance, reflectance, and absorption of the manufactured thermochromic film were analyzed. FIG. 7A to FIG. 11C are photographs and graphs showing the results. FIGS. 7A to 7D are color-variation photographs at high and low temperatures of a thermochromic film for a smart window according to an embodiment of the present disclosure when a vanadium dioxide thin-film is deposited to have thicknesses of 280 nm, 350 nm, 380 nm, and 530 nm, respectively. FIG. 8A to FIG. 8C are graphs showing transmittance, reflectance, and absorption based on a temperature when a vanadium dioxide thin-film is deposited to have a 500 nm thickness. FIG. 9A to FIG. 9C are graphs showing transmittance, reflectance, and absorption based on a temperature when a vanadium dioxide thin-film is deposited to have a 400 nm thickness. FIG. 10A to FIG. 10C are graphs showing transmittance, reflectance, and absorption based on a temperature when a vanadium dioxide thin-film is deposited to have a 250 nm thickness. FIG. 11A to FIG. 11C are graphs showing transmittance, reflectance, and absorption based on a temperature when a vanadium dioxide thin-film is deposited to have a 300 nm thickness. In each of FIG. 7A to FIG. 7D, upper and lower photographs are color photographs under the LED flashlight at low and high temperatures, respectively. In each of FIG. 7A to FIG. 7D, a left photograph is a black background image, and a right photograph is an image with letters on a white background. The black background absorbs an entirety of light such that light reflected from the silver thin-film is observed. Regarding the white background, light passing through a translucent silver thin-film is reflected back from the white background. Thus, color differences may occur. FIG. 8A, FIG. 9A, FIG. 10A and FIG. 11A are graphs showing transmittance based on a temperature. FIG. 8B, FIG. 9B, FIG. 10B and FIG. 11B are graphs showing reflectance based on a temperature. FIG. 8C, FIG. 9C, FIG. 10C and FIG. 11C are graphs showing absorption based on a temperature. In FIG. 8A to FIG. 11C, each solid line is a graph of a test result at 20° C. and each dotted line is a graph of a test result at 80° C.

Analysis of Color-Variation Characteristics 2

Additionally, visible light related color-variation characteristics were identified using a 10 nm silver reflective layer, and a vanadium dioxide thin-film layer having a thickness in a range of 800 to 950 nm. FIG. 12A to FIG. 12E are photographs and graphs of the results. FIG. 12A to FIG. 12E are photographs and graphs when the thickness of the vanadium dioxide thin-film is 800, 820, 850, 900, and 950 nm, respectively. It may be identified that colors such as red, green, and blue may be adjusted by adjusting the thickness of the vanadium dioxide thin-film in a range of 800 to 950 nm, and the thermochromic film exhibits visible light related color-variation characteristics before and after the phase transition.

Additionally, the luminous transmittance ($T_{-lum}$) representing visible light transmittance and solar energy transmittance modulation ($\Delta T_{-sol}$) representing solar light modulation capability related to energy storage may be identified. The thermochromic phenomenon, transmittance, reflectance, and absorption of the manufactured thermochromic film including the silver reflective film having a thickness of 10 nm were analyzed.

Figure 13A:
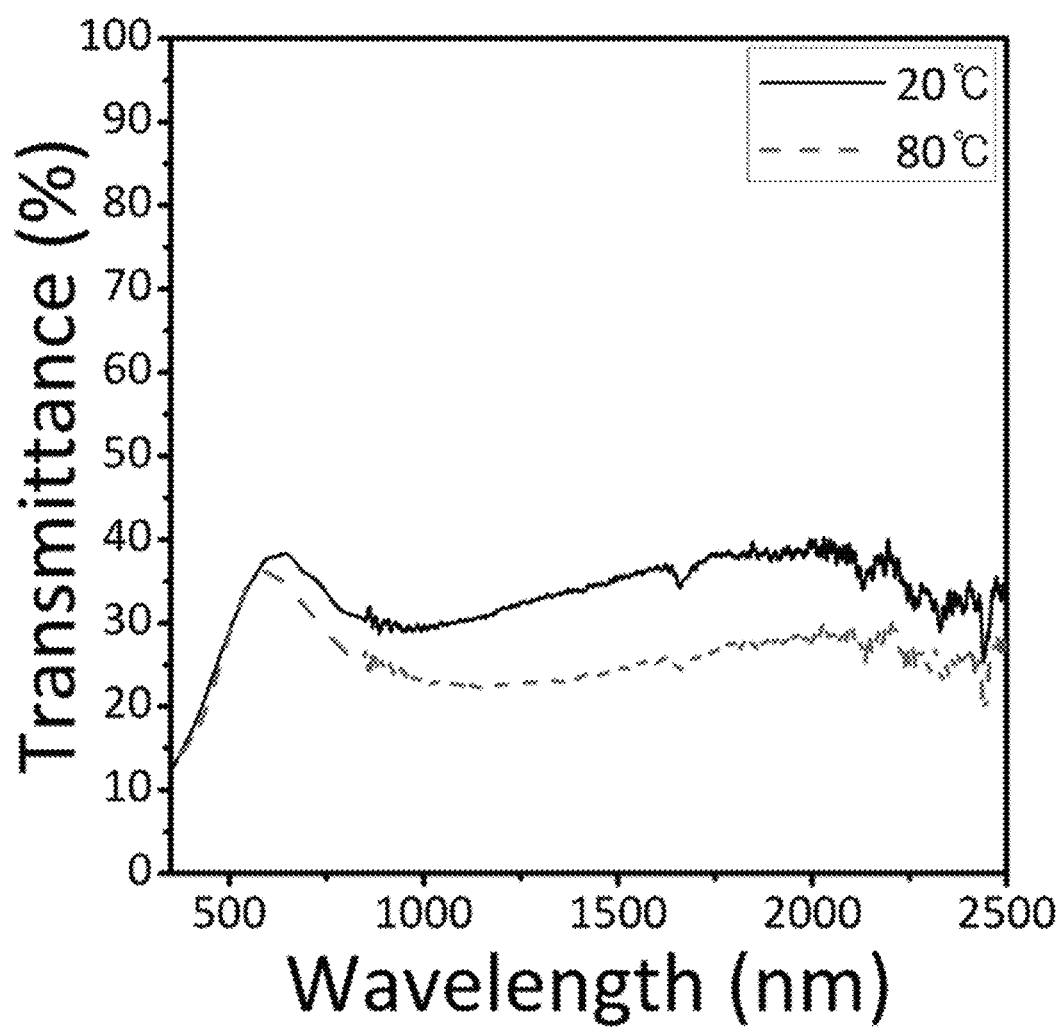
FIG. 13A to FIG. 13C are graphs of transmittance, reflectance, and absorption, respectively, when the vanadium dioxide thin-film is deposited to have a thickness of 800 nm.
Figure 13B:
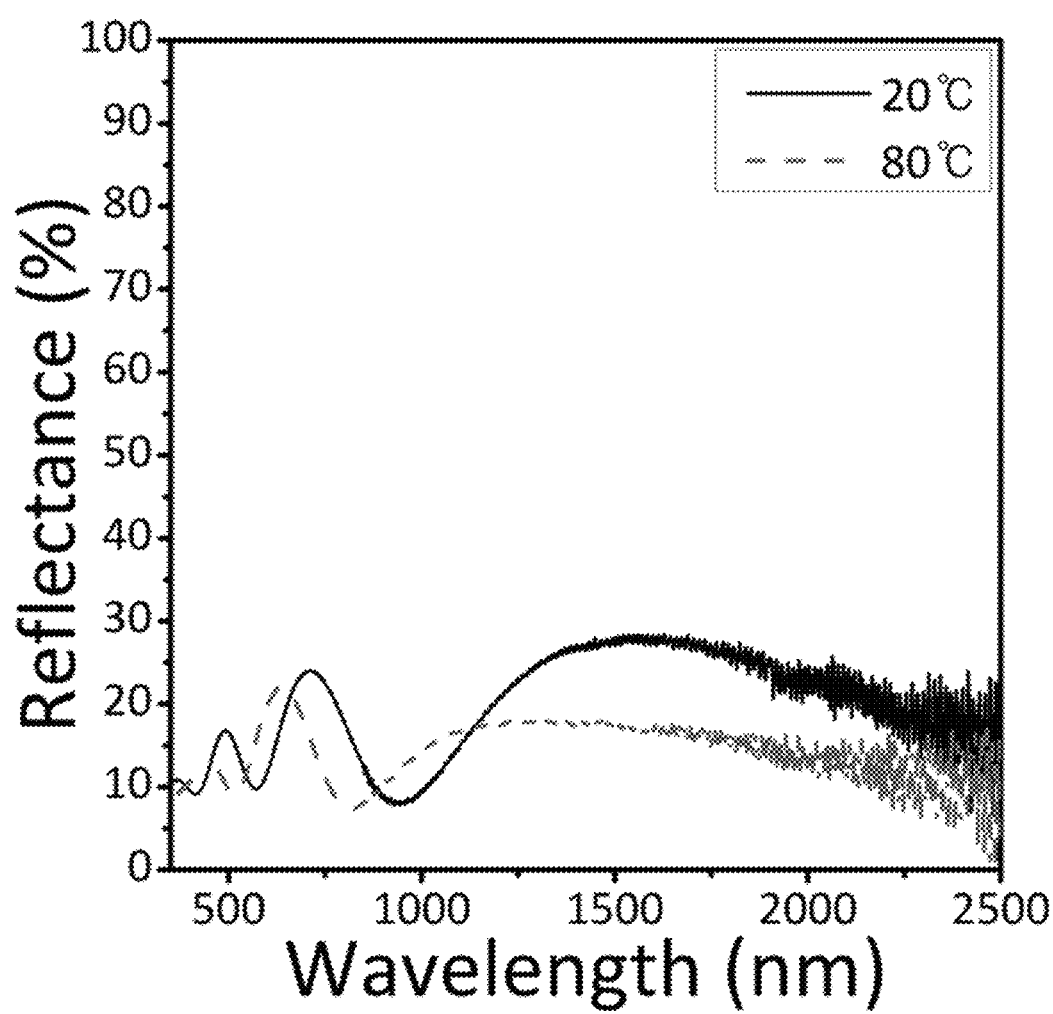
Figure 13C:
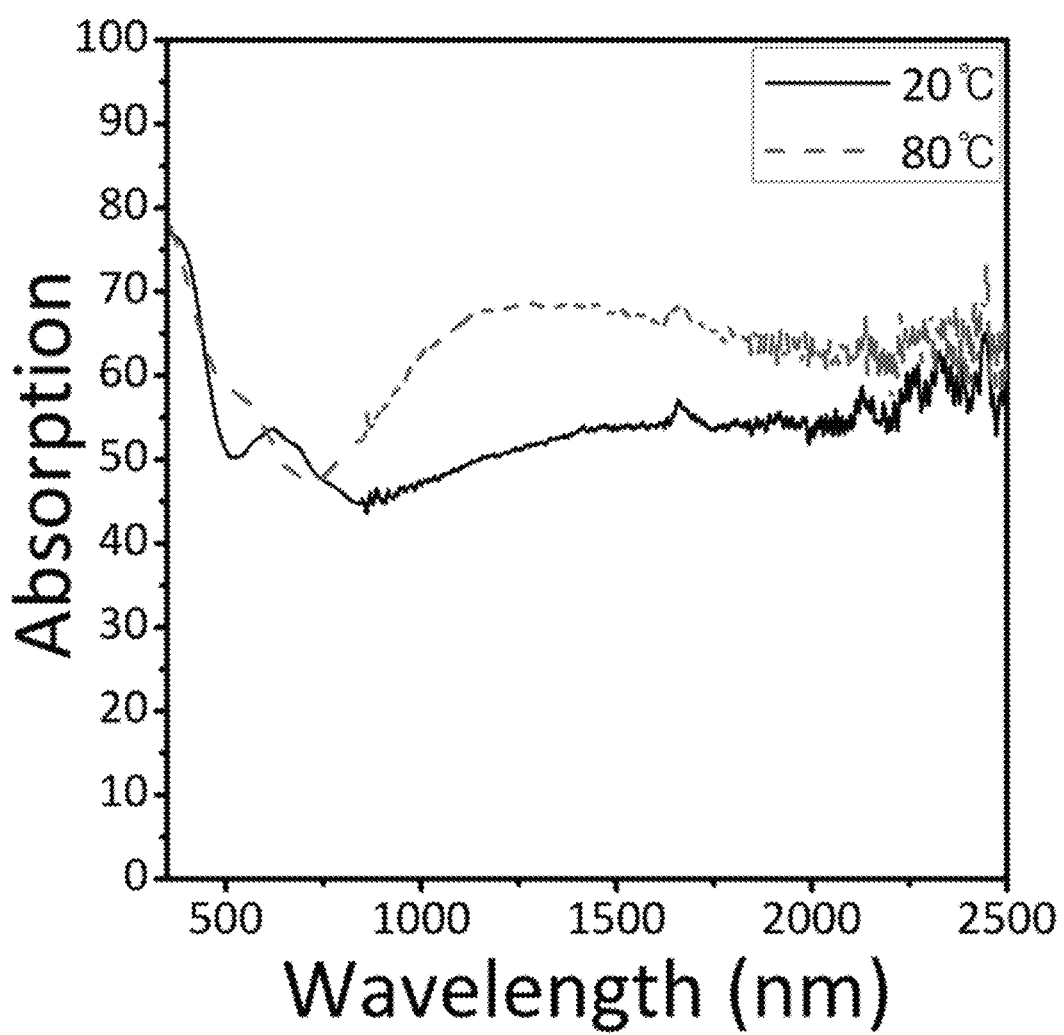
Figure 14A:
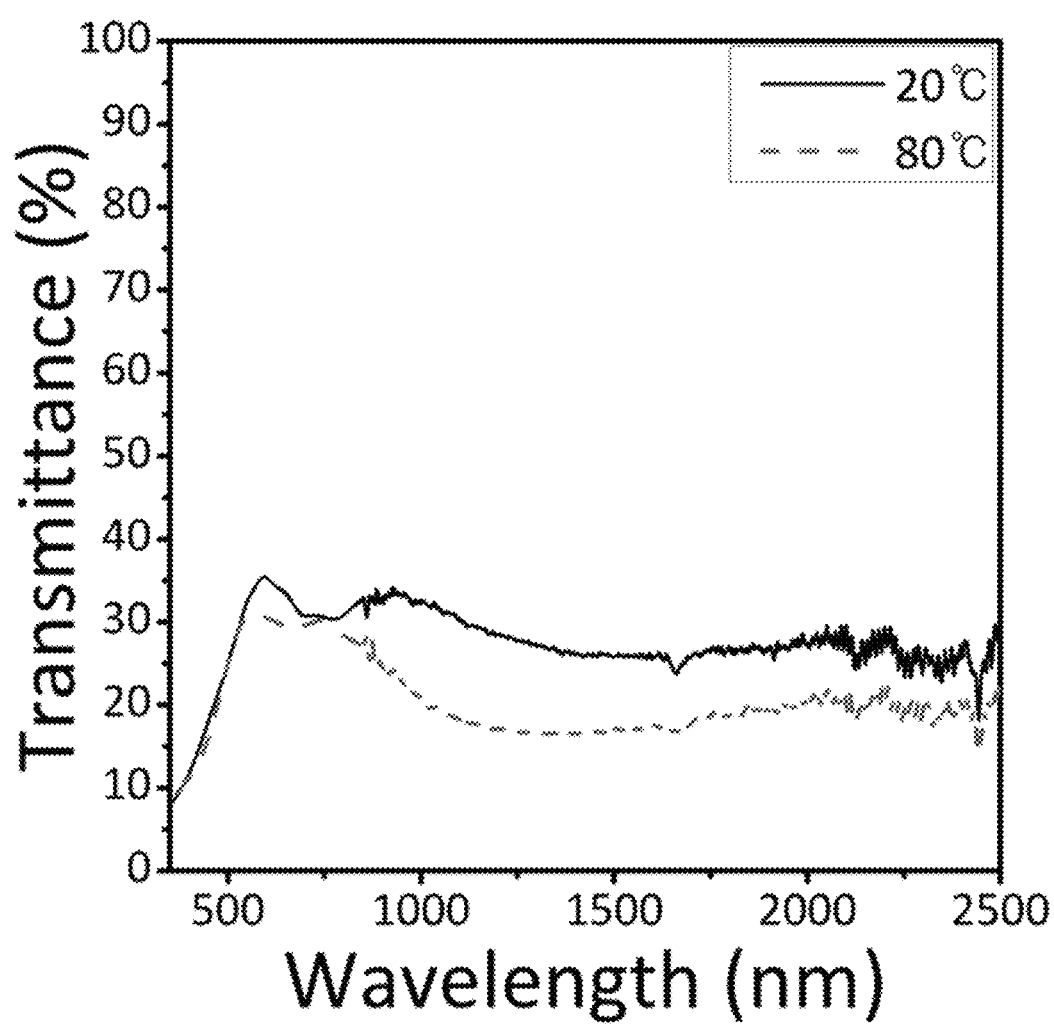
FIG. 14A to FIG. 14C are graphs of transmittance, reflectance, and absorption, respectively, when the vanadium dioxide thin-film is deposited to have a thickness of 820 nm.
Figure 14B:
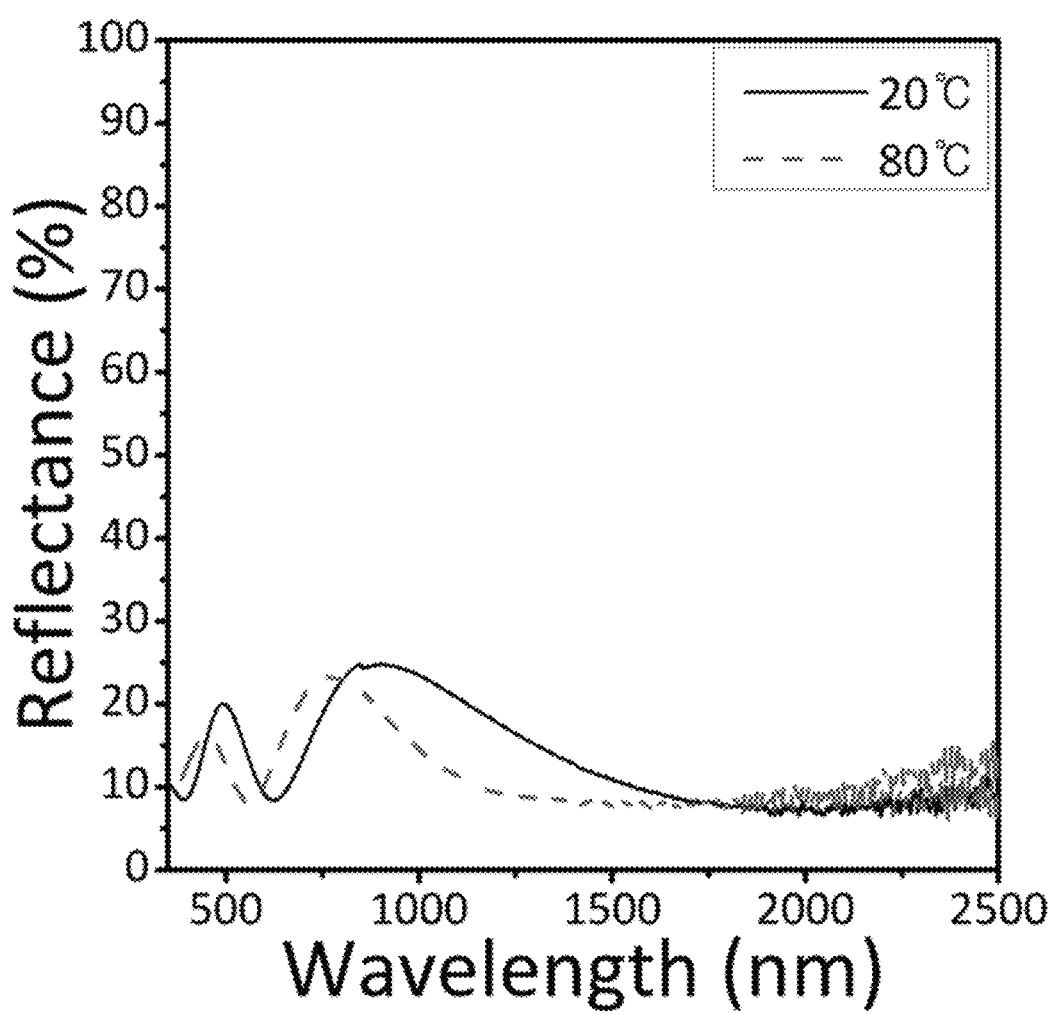
Figure 14C:
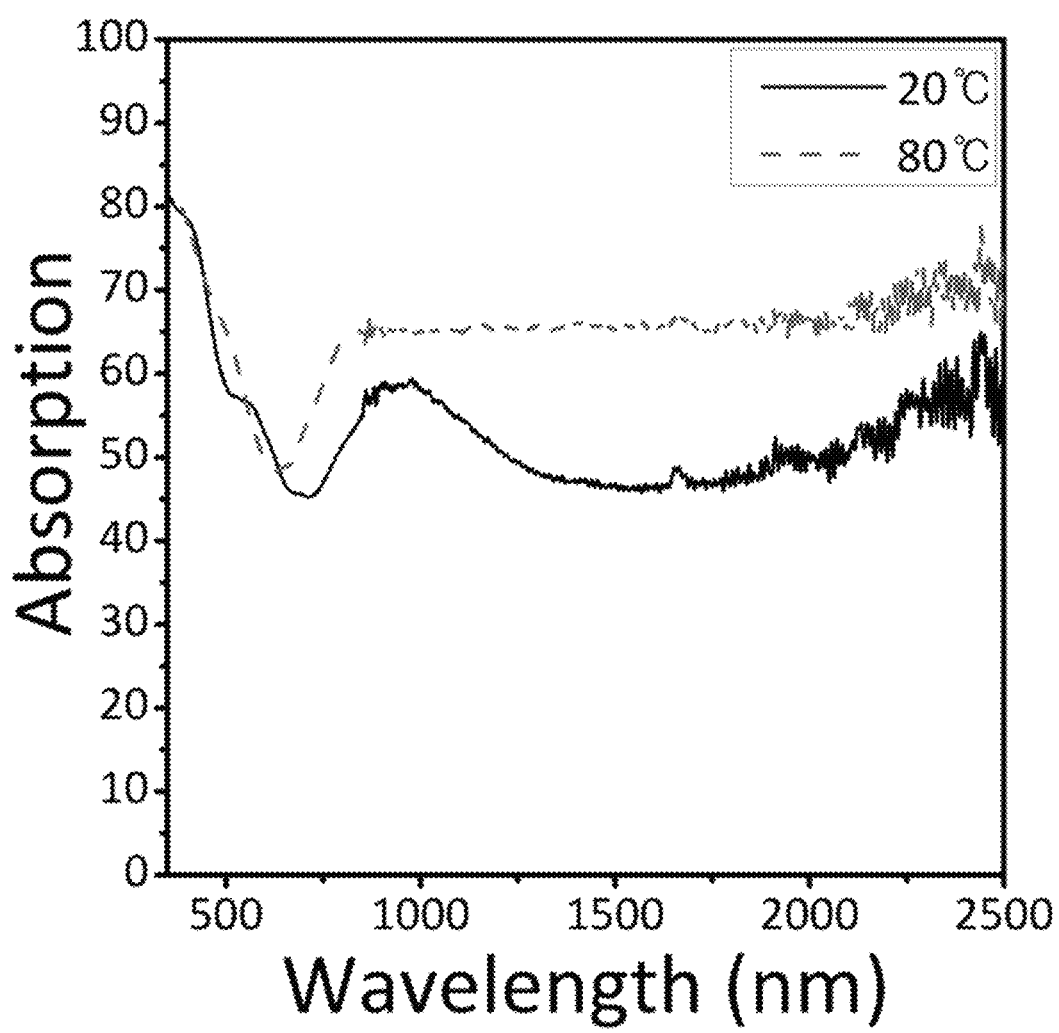
Figure 15A:
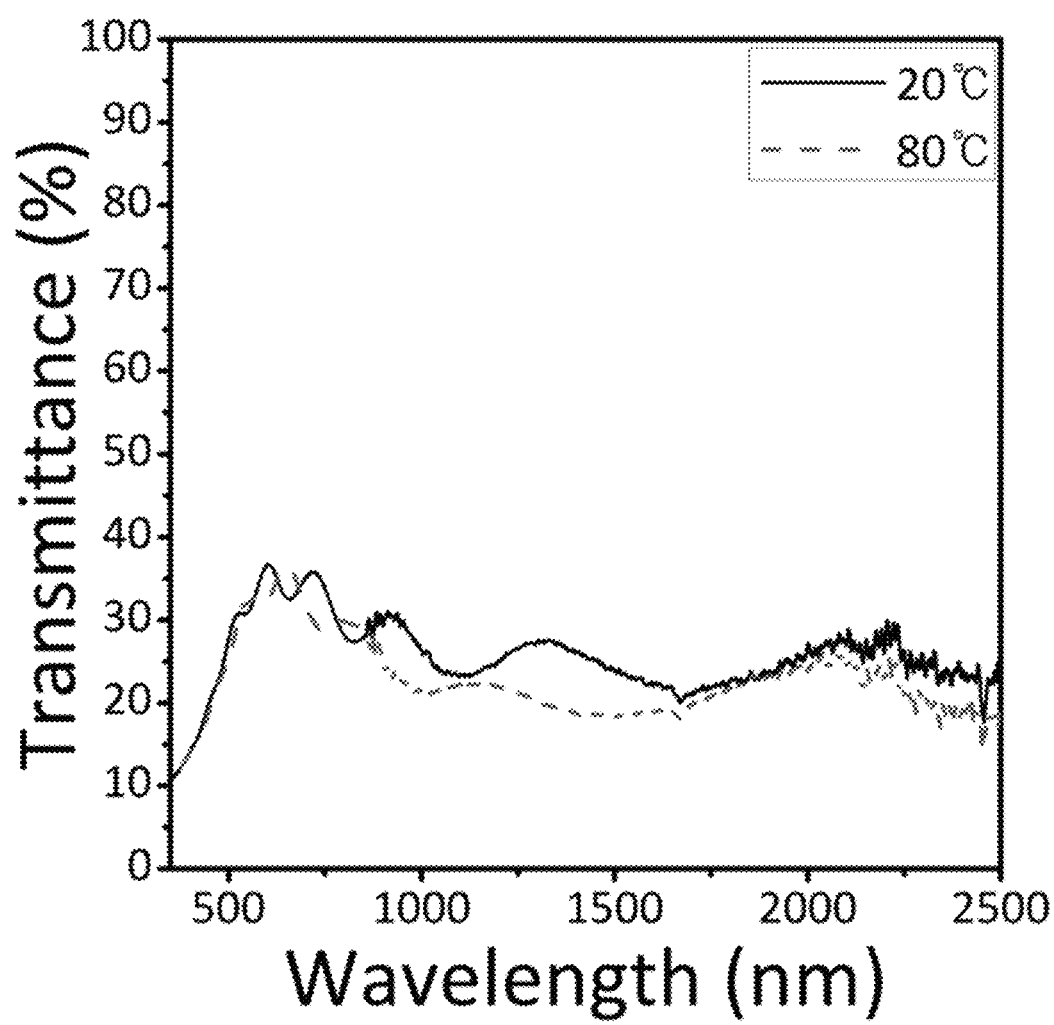
FIG. 15A to FIG. 15C are graphs of transmittance, reflectance, and absorption, respectively, when the vanadium dioxide thin-film is deposited to have a thickness of 850 nm.
Figure 15B:
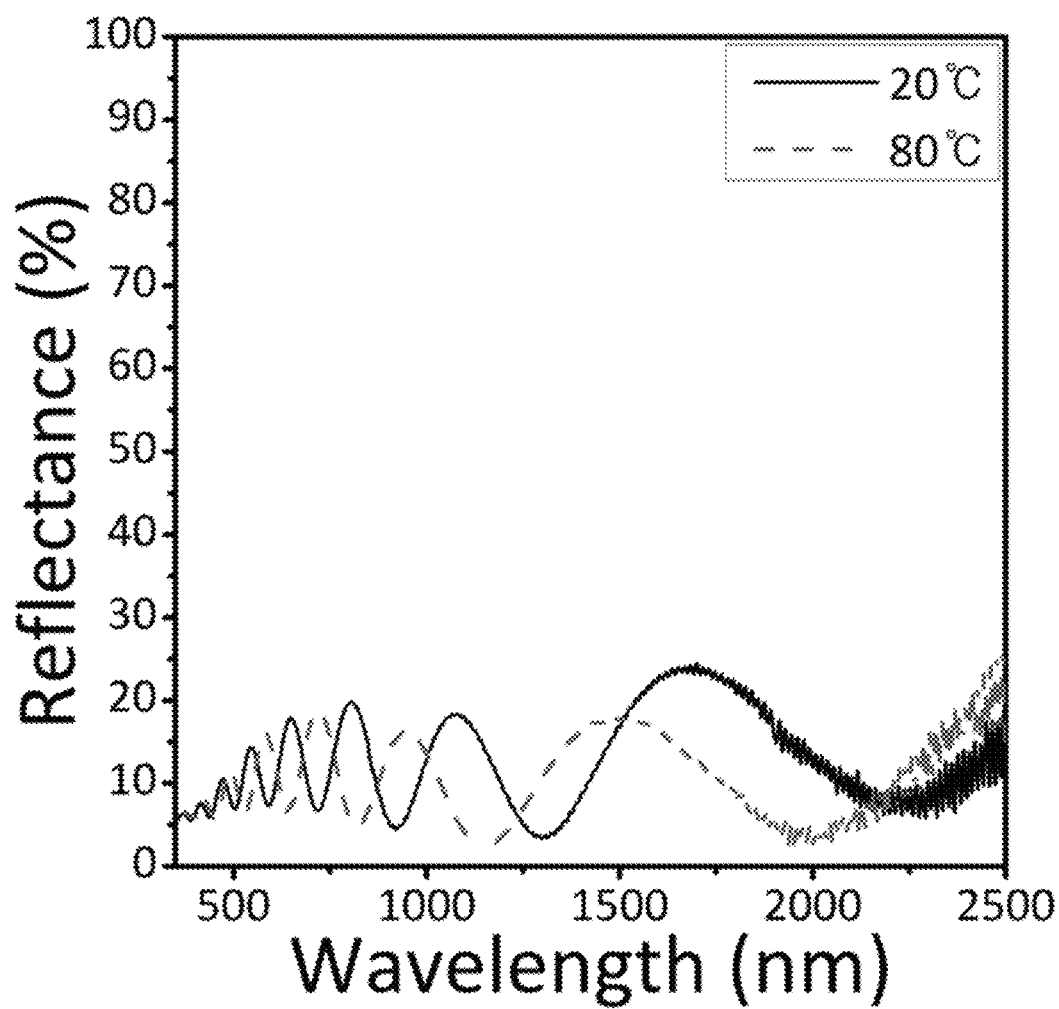
Figure 15C:
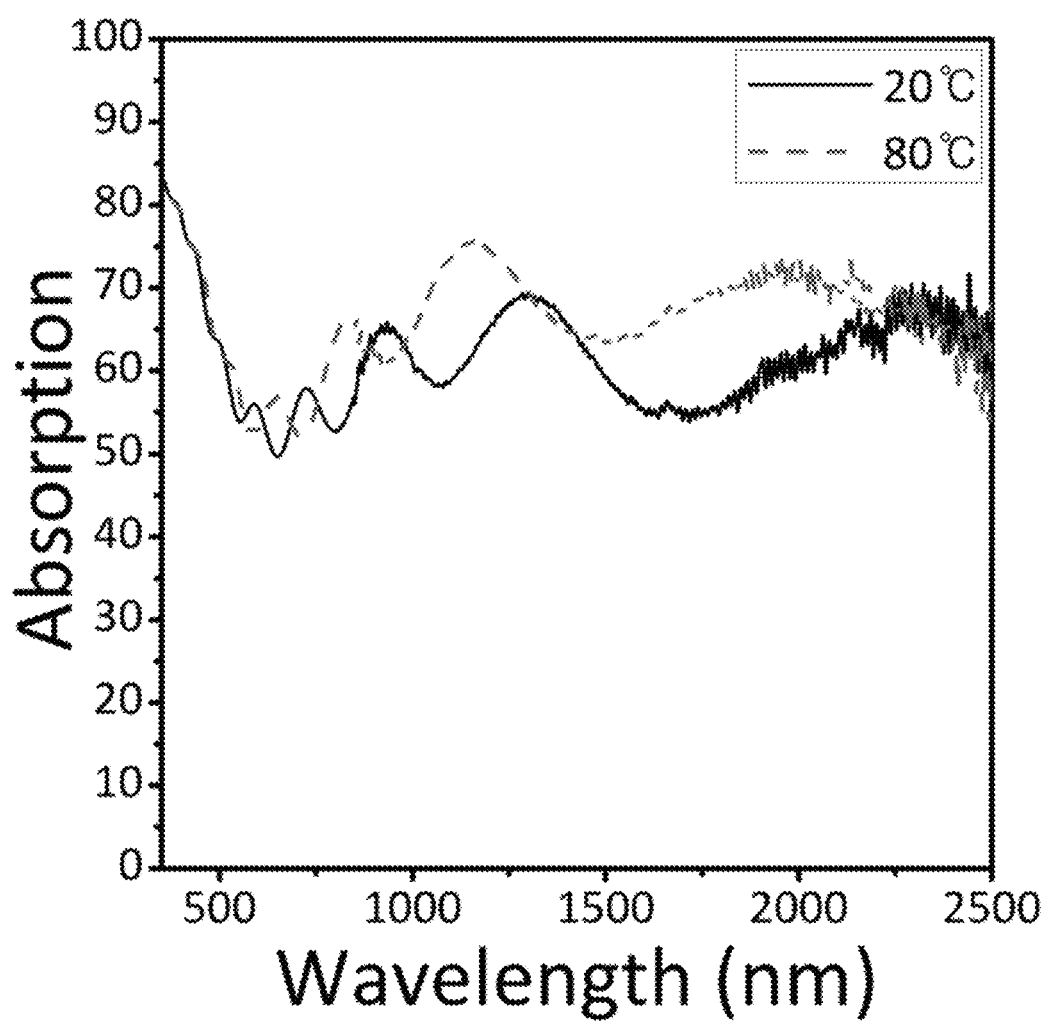
Figure 16A:
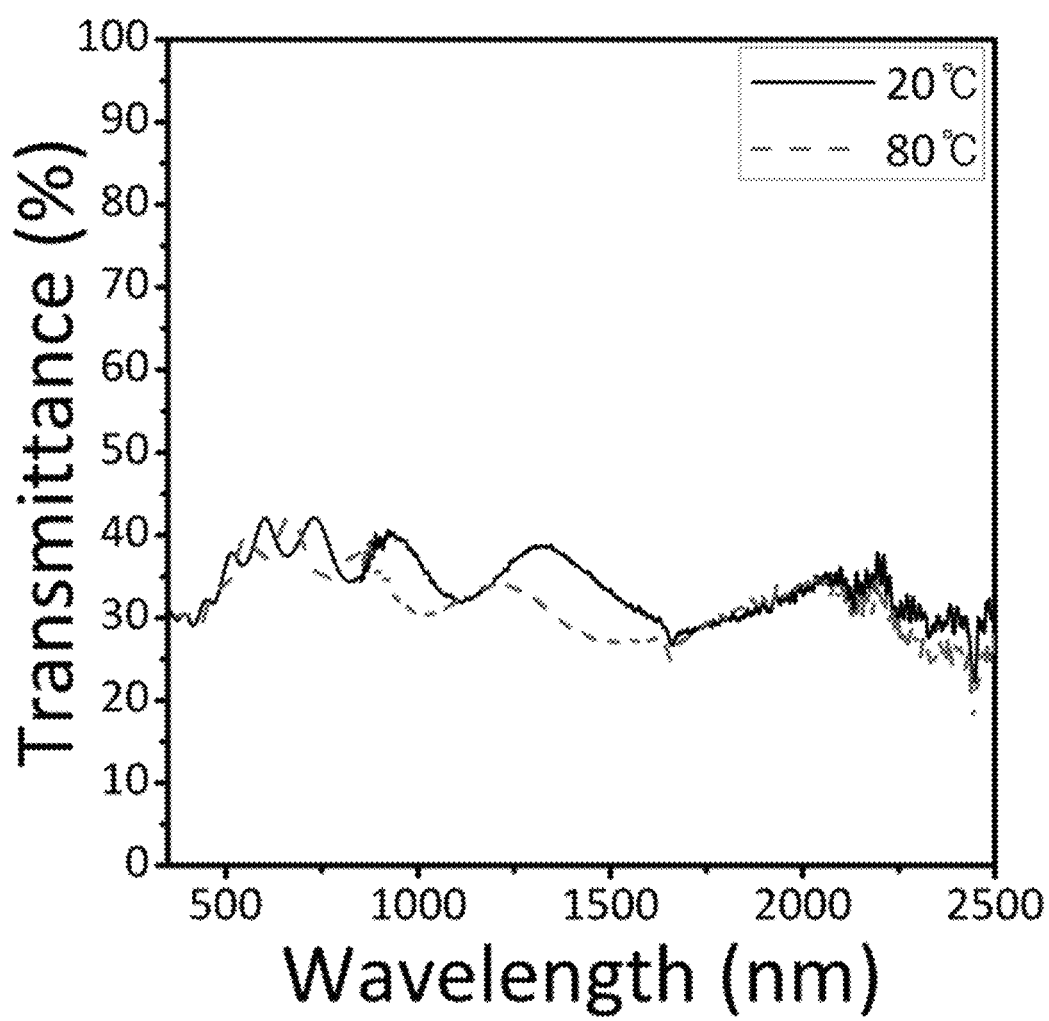
FIG. 16A to FIG. 16C are graphs of transmittance, reflectance, and absorption, respectively, when the vanadium dioxide thin-film is deposited to have a thickness of 900 nm.
Figure 16B:
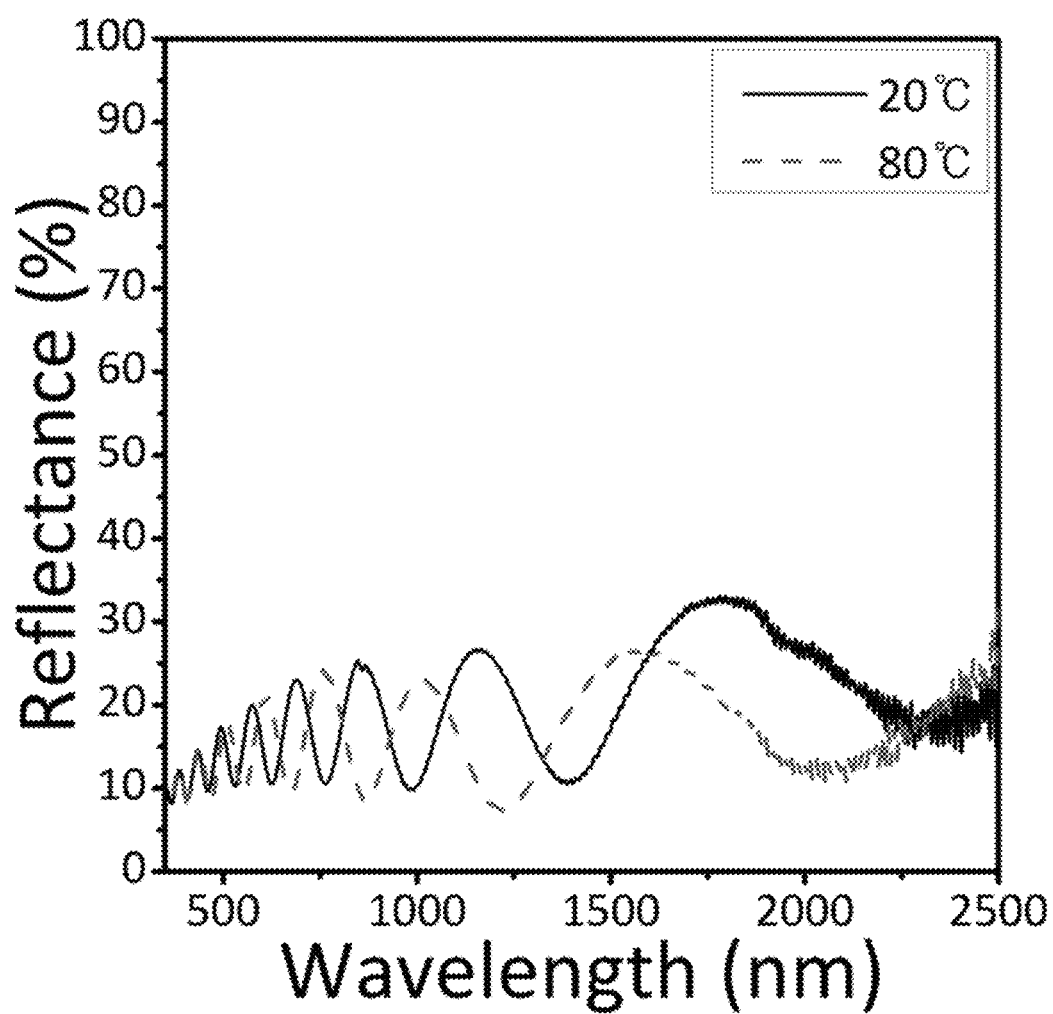
Figure 16C:
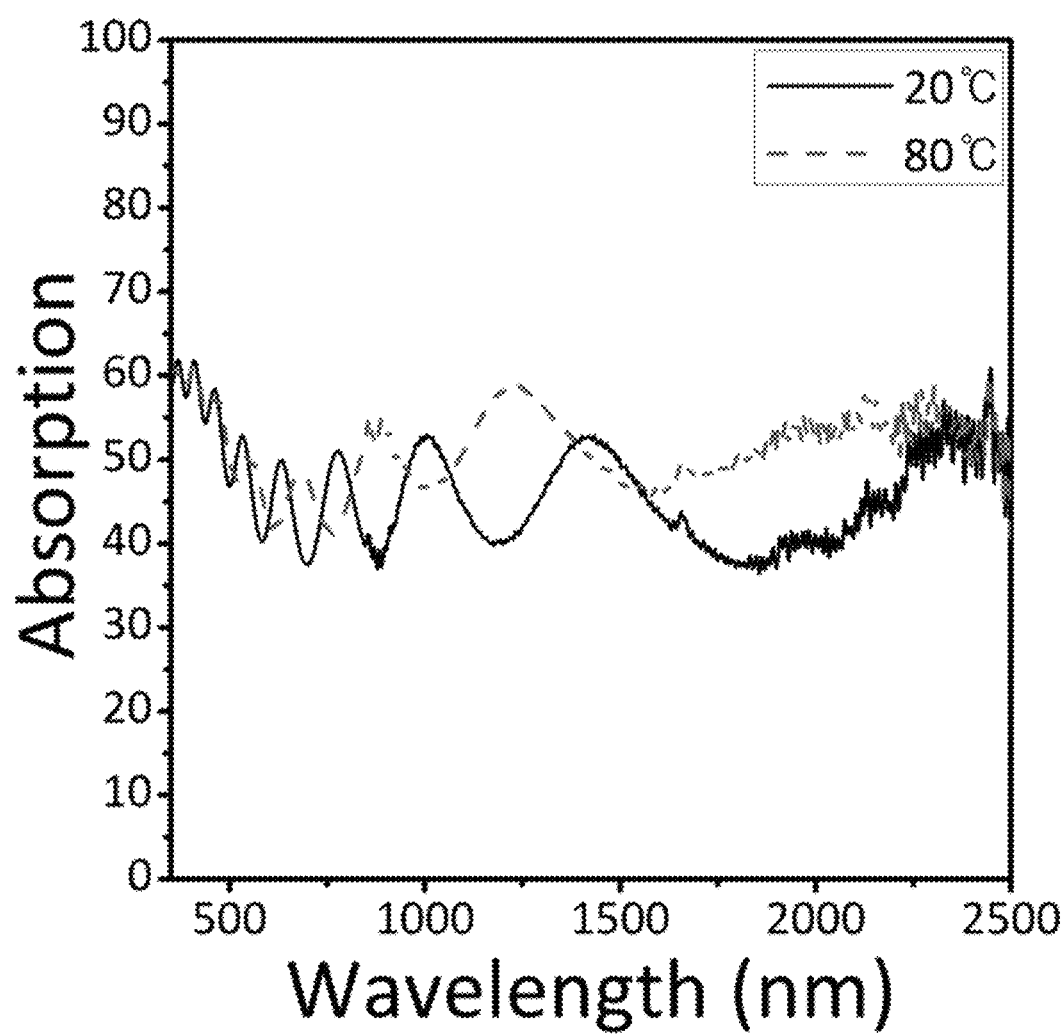
Figure 17A:
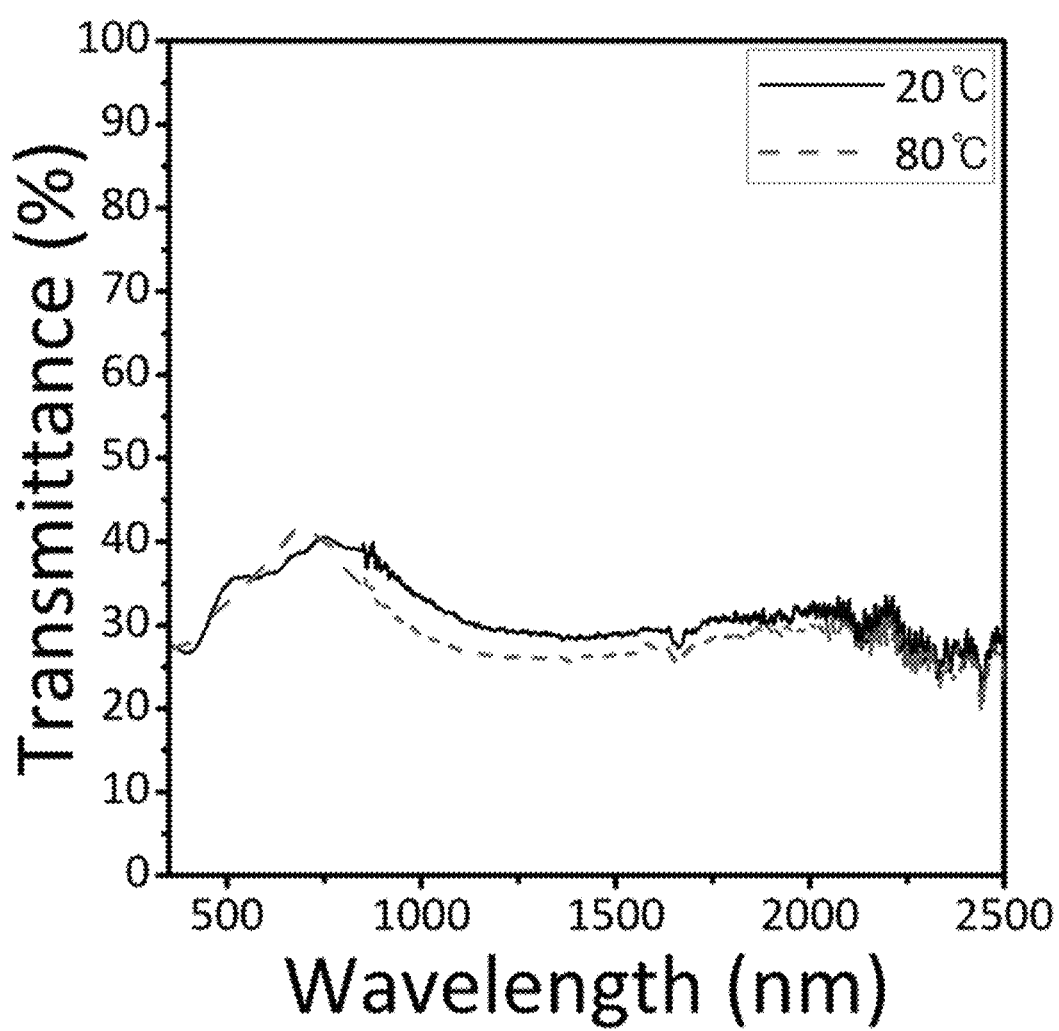
FIG. 17A to FIG. 17C are graphs of transmittance, reflectance, and absorption, respectively, when the vanadium dioxide thin-film is deposited to have a thickness of 950 nm.
Figure 17B:
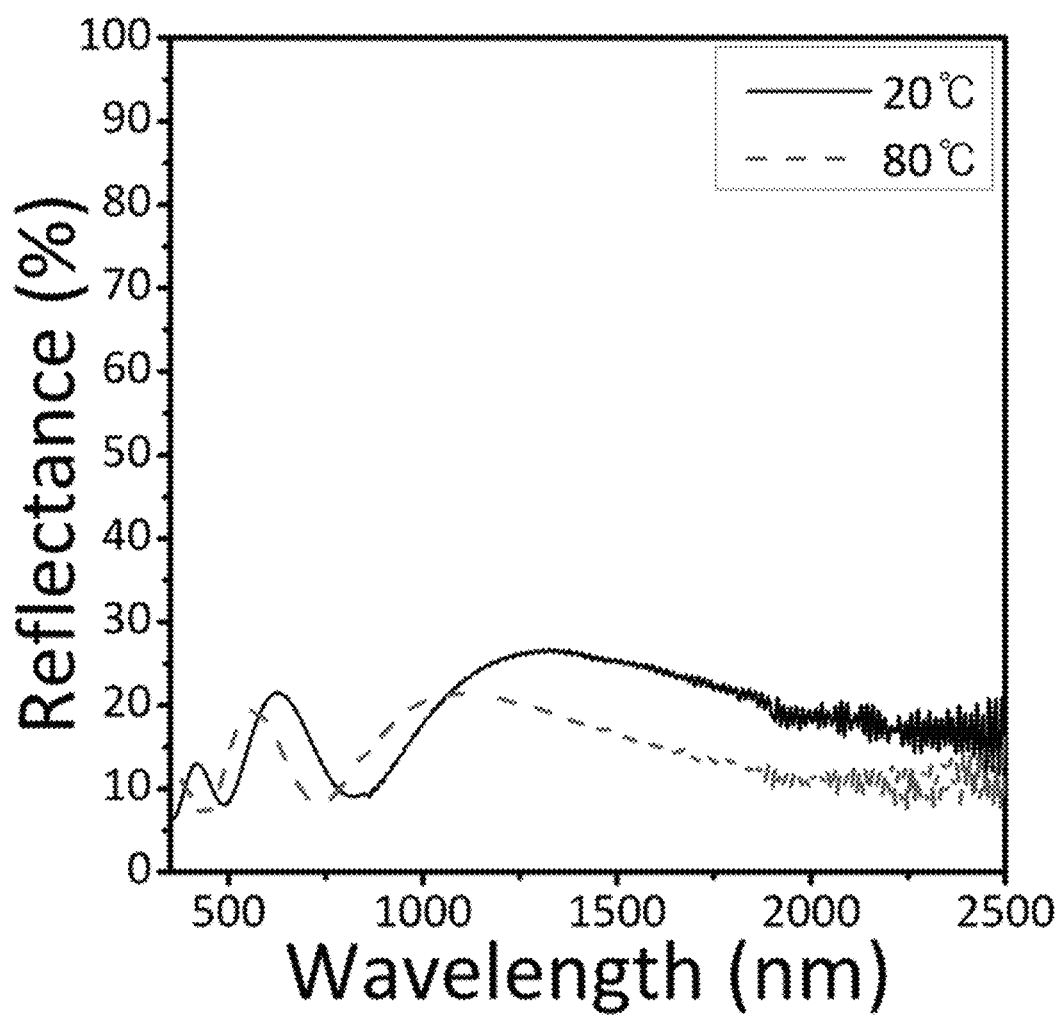
Figure 17C:
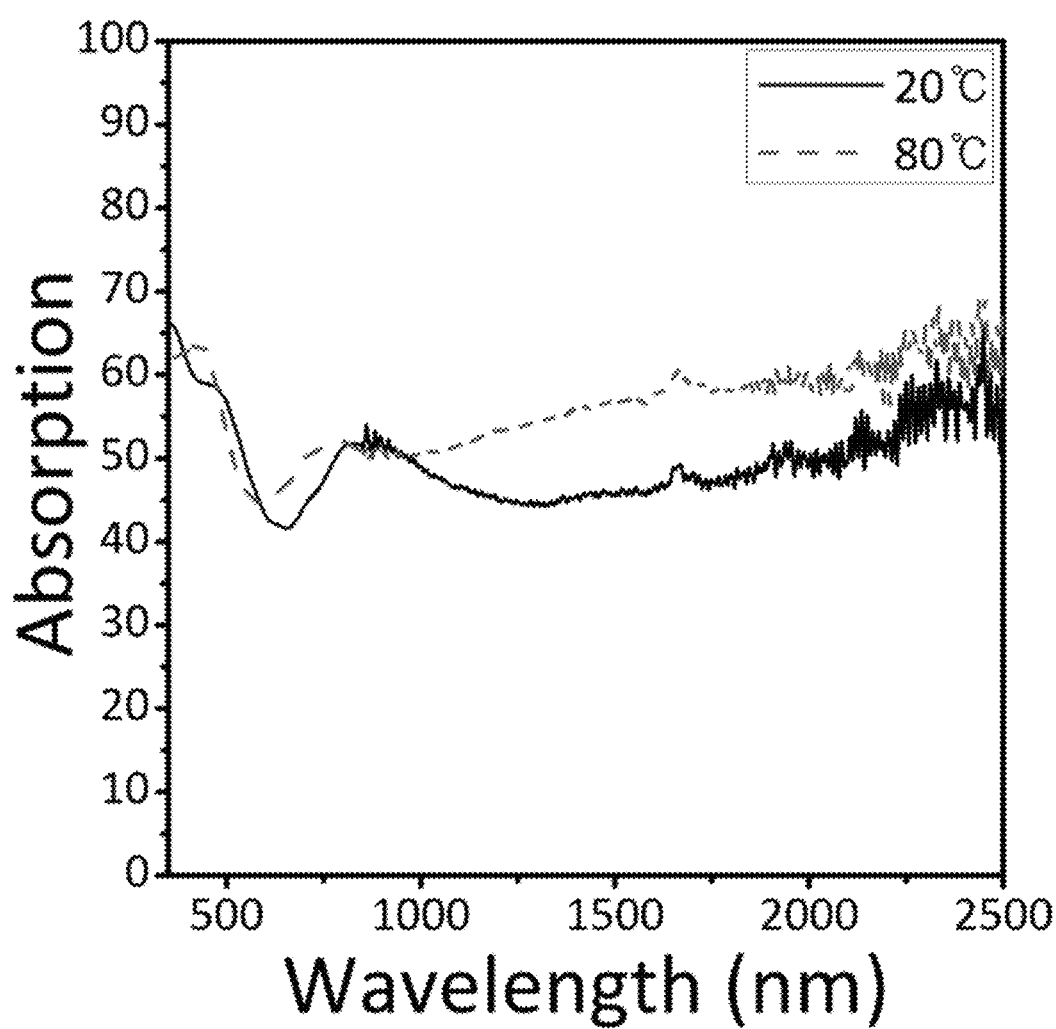

FIG. 13A to FIG. 13C are graphs of transmittance, reflectance, and absorption, respectively, when the vanadium dioxide thin-film is deposited to have a thickness of 800 nm. FIG. 14A to FIG. 14C are graphs of transmittance, reflectance, and absorption, respectively, when the vanadium dioxide thin-film is deposited to have a thickness of 820 nm. FIG. 15A to FIG. 15C are graphs of transmittance, reflectance, and absorption, respectively, when the vanadium dioxide thin-film is deposited to have a thickness of 850 nm. FIG. 16A to FIG. 16C are graphs of transmittance, reflectance, and absorption, respectively, when the vanadium dioxide thin-film is deposited to have a thickness of 900 nm. FIG. 17A to FIG. 17C are graphs of transmittance, reflectance, and absorption, respectively, when the vanadium dioxide thin-film is deposited to have a thickness of 950 nm.

Figure 18:
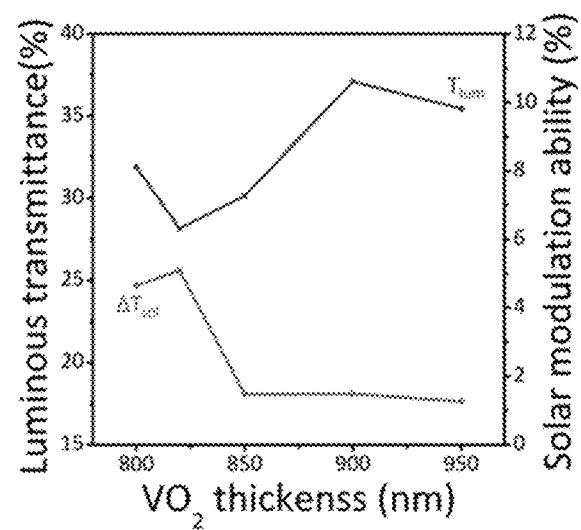
FIG. 18 is a graph showing luminous transmittance and solar modulation ability based on a thickness of a vanadium dioxide film.

FIG. 18 is a graph showing luminous transmittance and solar modulation ability based on a thickness of a vanadium dioxide film. Numerical values of the graph of FIG. 18 are shown in Table 2 below.

TABLE 2

| | | VO$_2$ Thickness(nm) | | | | |
|---|---|---|---|---|---|---|
| | | 800 | 820 | 850 | 900 | 950 |
| Ag 10 nm | $T_{lum}$ (%) | 31.90 | 28.16 | 30.15 | 37.10 | 35.46 |
| | $\Delta T_{sol}$ (%) | 4.65 | 5.09 | 1.48 | 1.49 | 1.27 |

| | | VO$_2$ Thickness(nm) | | | |
|---|---|---|---|---|---|
| | | 280 | 350 | 380 | 530 |
| Ag 20 nm | $T_{lum}$ (%) | 31.48 | 25.34 | 33.77 | 38.17 |
| | $\Delta T_{sol}$ (%) | 1.89 | 0.77 | 0.87 | 0.51 |

Referring to FIG. 18 and Table 2, the thermochromic film for the smart window including the silver (Ag) reflective film exhibits the luminous transmittance ($T_{lum}$) of around 30%, and a maximum value 5% of the solar modulation ability ($\Delta T_{sol}$). In this regard, the luminous transmittance means an amount by which the thermochromic film transmits light in the visible light region therethrough, and is related to transparency of the window. The solar modulation ability refers to change in transmittance of light in the infrared region before and after the phase transition, and is related to energy saving ability of the smart window. The luminous transmittance and the solar modulation ability were calculated using following formulas:

$$T_{lum} = \int \Phi_{lum}(\lambda) T d\lambda / \int \Phi_{lum}(\lambda) d\lambda (380 \text{ nm} \leq \lambda \leq 780 \text{ nm})$$

$$T_{sol} = \int \Phi_{sol}(\lambda) T d\lambda / \int \Phi_{sol}(\lambda) d\lambda (300 \text{ nm} \leq \lambda \leq 2500 \text{ nm})$$

$$\Delta T_{sol} = T_{sol}(25° \text{ C.}) - T_{sol}(80° \text{ C.})$$

λ: Specific wavelength
$\Phi_{lum}$: Luminance irradiance spectrum
$\Phi_{sol}$: Solar irradiance spectrum (for atmospheric mass 1.5 (AM 1.5))

Although the present disclosure has been described with reference to a preferred embodiment of the present disclosure, those skilled in the art will variously modify and change the present disclosure without departing from the spirit and scope of the present disclosure as described in the following patent claims.

What is claimed is:

1. A method for manufacturing a thermochromic film for a smart window, the method comprising:
    a first step of forming a metal thin-film on a substrate; and
    a second step including:
        heating a first solution containing a vanadium dioxide precursor to perform hydrothermal synthesis of vanadium dioxide;
        dispersing the synthesized vanadium dioxide in a solvent to prepare ink; and
        applying the ink onto a surface of the metal thin-film formed on the substrate to coat vanadium dioxide on the metal thin-film,
    wherein the metal thin-film layer reflects visible light.

2. The method of claim 1, wherein the first solution further contains tungsten at 0.75 mol % or smaller.

3. The method of claim 1, wherein the substrate includes polyethylene terephthalate (PET).

4. The method of claim 1, wherein the metal thin-film includes at least one metal selected from silver, aluminum, platinum, palladium, or gold.

5. The method of claim 4, wherein the metal thin-film includes a silver thin-film, and
    wherein the silver thin-film has a thickness in a range of 3 to 20 nm.

6. A thermochromic film for a smart window, wherein the thermochromic film is manufactured by the method of claim 1.

7. A thermochromic film for a smart window, the thermochromic film comprising:
    a substrate;
    a metal thin-film layer formed on the substrate; and
    a vanadium dioxide thin-film formed on the metal thin-film layer,
    wherein the substrate includes polyethylene terephthalate (PET),
    wherein the metal thin-film layer reflects visible light, and
    wherein the metal thin-film layer includes at least one metal selected from silver, aluminum, platinum, palladium, or gold.

8. The thermochromic film of claim 7, wherein the vanadium dioxide thin-film further contains tungsten at 0.75 mol % or smaller.

9. The thermochromic film of claim 7, wherein the metal thin-film layer includes a silver thin-film, and
    wherein the silver thin-film has a thickness in a range of 3 to 20 nm.

10. The thermochromic film of claim 7, wherein the thermochromic film exhibits color-variation at a temperature of 30 to 75° C.

11. A smart window comprising:
    a window substrate; and
    a thermochromic film attached to at least one face of the window substrate, wherein the thermochromic film includes the thermochromic film of claim 7.

12. The thermochromic film of claim 7, wherein the thermochromic film includes a luminous transmittance ($T_{lum}$) of about 30%.

13. The thermochromic film of claim 7, wherein the thermochromic film includes a solar modulation ability ($\Delta T_{sol}$) of up to 5%.

14. The thermochromic film of claim 7, wherein the vanadium dioxide thin-film includes a luminous transmittance ($T_{lum}$) of about 38% or less.

15. The thermochromic film of claim 7, wherein the vanadium dioxide thin-film includes a thickness of 10 nm to 20 nm.

16. The thermochromic film of claim 7, wherein the thermochromic film exhibits color-variation at a temperature of 30 to 75° C.

17. The thermochromic film of claim 7, wherein the thermochromic film further comprises a curved surface.

18. A window comprising the thermochromic film of claim 7.

* * * * *